United States Patent
Holmes et al.

(10) Patent No.: US 7,311,748 B2
(45) Date of Patent: Dec. 25, 2007

(54) AIR FILTER ASSEMBLY SYSTEM AND METHOD

(75) Inventors: Lester E. Holmes, South Haven, MS (US); Steven R. Jones, Olive Branch, MS (US); Clifford D. Haggard, Collierville, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 514 days.

(21) Appl. No.: 11/054,420

(22) Filed: Feb. 9, 2005

(65) Prior Publication Data
US 2005/0193695 A1    Sep. 8, 2005

Related U.S. Application Data

(60) Provisional application No. 60/549,515, filed on Mar. 2, 2004.

(51) Int. Cl.
*B01D 46/00*    (2006.01)
(52) U.S. Cl. .............................. 55/498; 55/502; 55/503; 55/521; 55/482; 55/459.1; 55/337; 55/501; 210/282; 210/DIG. 17; 264/DIG. 48
(58) Field of Classification Search .................. 55/482, 55/337, 459.1, 498, 501, 502, 503, 521; 210/282, DIG. 17; 264/DIG. 48
See application file for complete search history.

(56) References Cited

U.S. PATENT DOCUMENTS

| | | | |
|---|---|---|---|
| 2,865,511 A | 12/1958 | Hopkins, Jr. | |
| 2,916,143 A | 12/1959 | McConalogue | |
| 3,078,650 A | 2/1963 | Anderson et al. | |
| 3,385,039 A | 5/1968 | Burke et al. | |
| 4,135,899 A | 1/1979 | Gauer | |
| 4,211,543 A | 7/1980 | Tokar et al. | |
| 4,243,397 A | 1/1981 | Tokar et al. | |
| 4,256,474 A | 3/1981 | Berger, Jr. et al. | |
| 4,382,808 A | 5/1983 | Van Wormer, Jr. et al. | |
| 4,491,460 A | 1/1985 | Tokar | |
| 4,720,292 A | 1/1988 | Engel et al. | |
| 4,767,427 A | 8/1988 | Barabas et al. | |
| 5,013,182 A | 5/1991 | Coulonvaux et al. | |
| 5,064,458 A | 11/1991 | Machado | |

(Continued)

FOREIGN PATENT DOCUMENTS

DE    1 563 649    3/1980

*Primary Examiner*—Duane Smith
*Assistant Examiner*—Minh-Chau T. Pham
(74) *Attorney, Agent, or Firm*—Christopher H. Hunter

(57) ABSTRACT

An air filter assembly including abutting, cylindrical housing halves, with toothed outer ends, joined via spaced, T-shaped appendages; a cylindrical air inlet of abutting semi-cylindrical housing inlet portions; a primary filter pack, for slip-fit insertion into either housing half, having an end cap integral with a cylindrical primary filter pack having sealing material on its inner end; a filter outlet end with a toothed peripheral portion, for slip-fit insertion into and angular adjustment relative to either housing end, and a plurality of ribs defining locating surfaces for an air outlet portion, and main and safety filters; the latter having a truncated cone body and an inverted conical portion; and a filter attachment base having curved bed portions, for receiving a housing periphery portion, including spaced support pads and slot portions for angularly adjustably receiving like numbers of T-shaped appendages, with a locking mechanism joining the housing and attachment base.

51 Claims, 24 Drawing Sheets

U.S. PATENT DOCUMENTS

| | | |
|---|---|---|
| 5,120,337 A | 6/1992 | Benzler et al. |
| 5,545,241 A | 8/1996 | Vanderauwera et al. |
| 5,549,724 A | 8/1996 | Mochida |
| D389,119 S | 1/1998 | Nuovo et al. |
| D407,475 S | 3/1999 | Coulonvaux et al. |
| D412,567 S | 8/1999 | Ward et al. |
| D412,568 S | 8/1999 | Ward et al. |
| D421,110 S | 2/2000 | Coulonvaux et al. |
| 6,022,055 A | 2/2000 | Coulonvaux et al. |
| 6,039,778 A | 3/2000 | Coulonvaux |
| 6,051,042 A | 4/2000 | Coulonvaux |
| 6,096,108 A | 8/2000 | Coulonvaux et al. |
| 6,139,607 A | 10/2000 | Coulonvaux |
| 6,149,700 A | 11/2000 | Morgan et al. |
| D440,645 S | 4/2001 | Coulonvaux et al. |
| 6,258,144 B1 | 7/2001 | Huang |
| 6,261,334 B1 | 7/2001 | Morgan et al. |
| 6,334,887 B1 | 1/2002 | Coulonvaux |
| 6,383,244 B1 | 5/2002 | Wake et al. |
| 6,398,832 B2 | 6/2002 | Morgan et al. |
| 2004/0068970 A1 | 4/2004 | Hasegawa et al. |
| 2004/0134171 A1 | 7/2004 | Scott et al. |
| 2006/0225389 A1* | 10/2006 | Scott et al. ............ 55/498 |

* cited by examiner

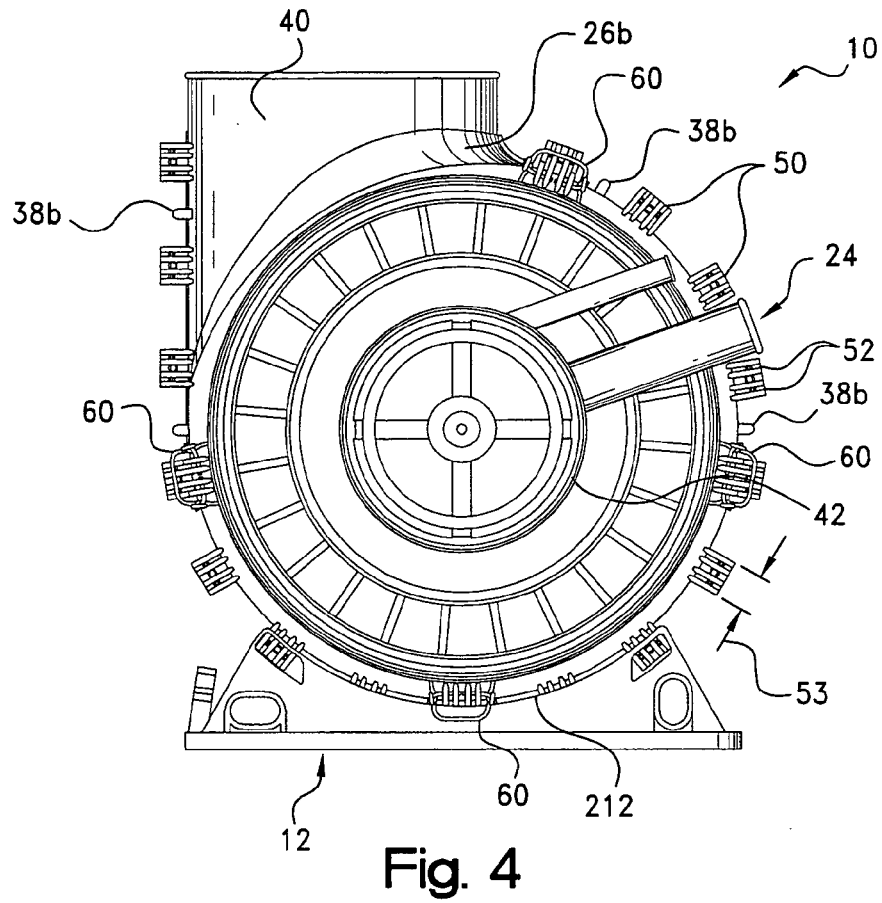
Fig. 4
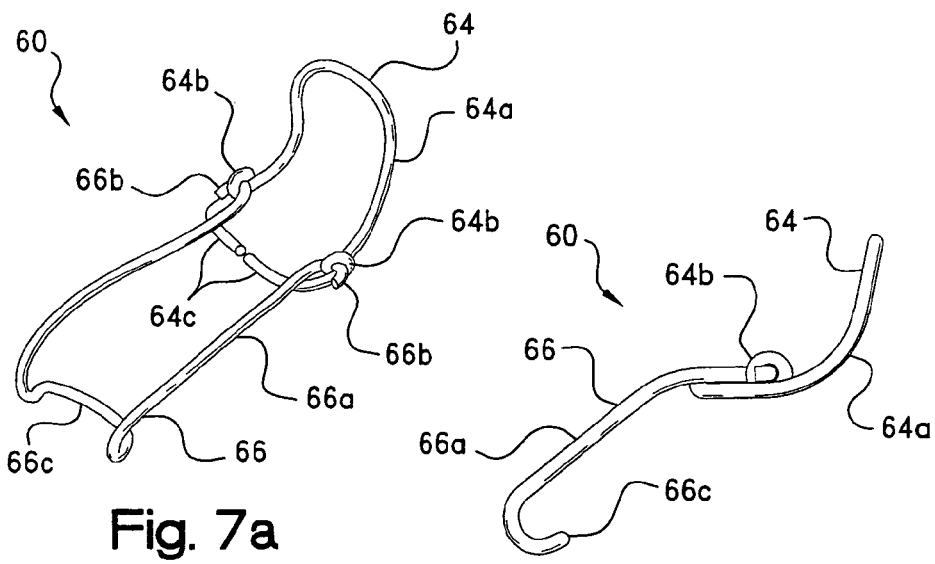
Fig. 7a
Fig. 7b

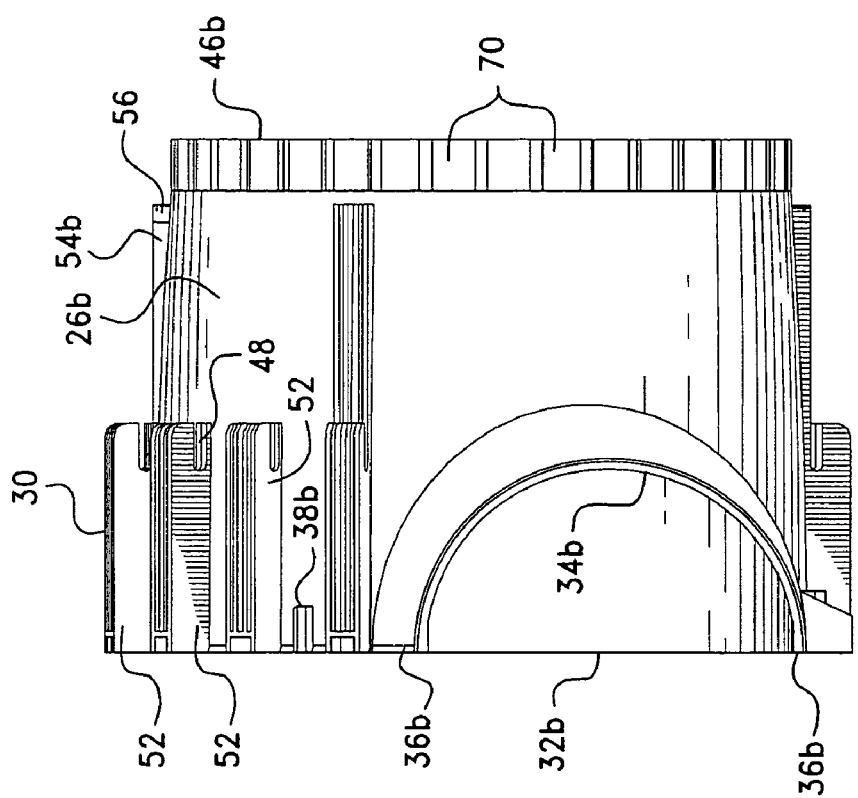
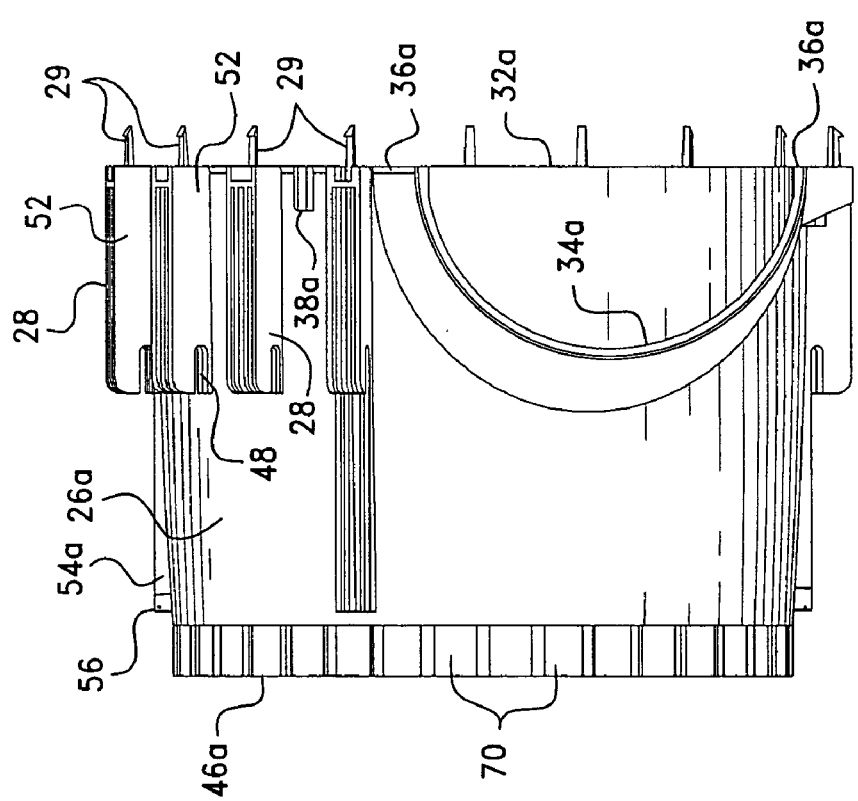
Fig. 5a
Fig. 5b

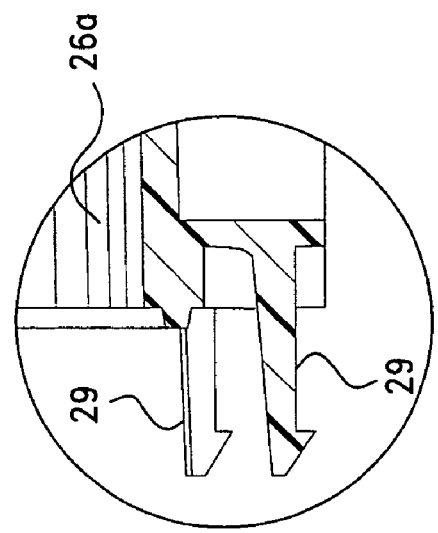
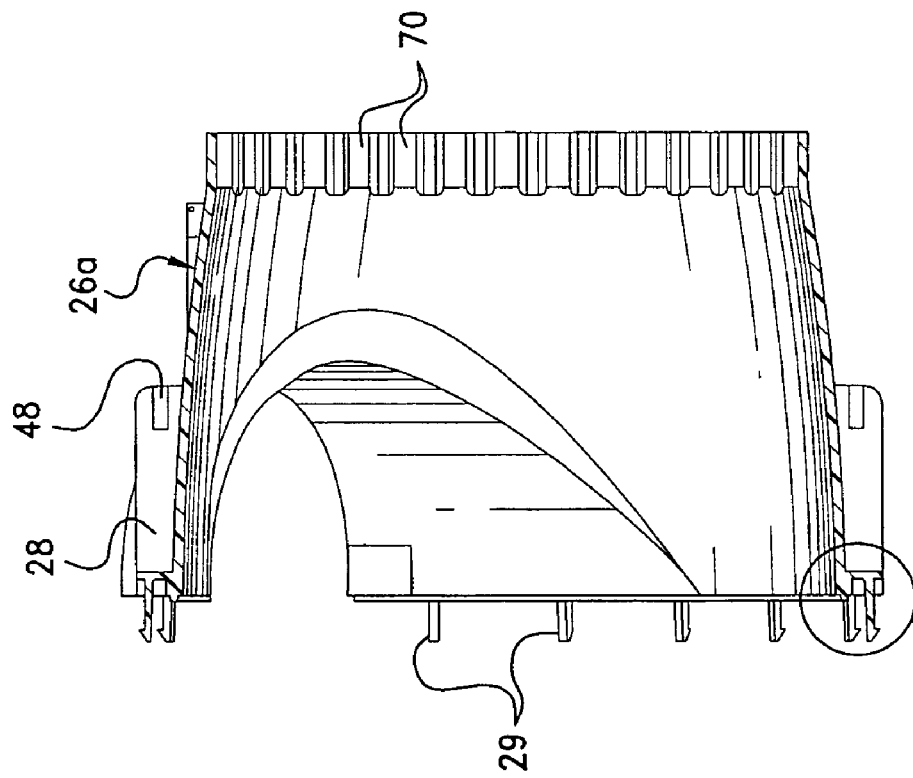

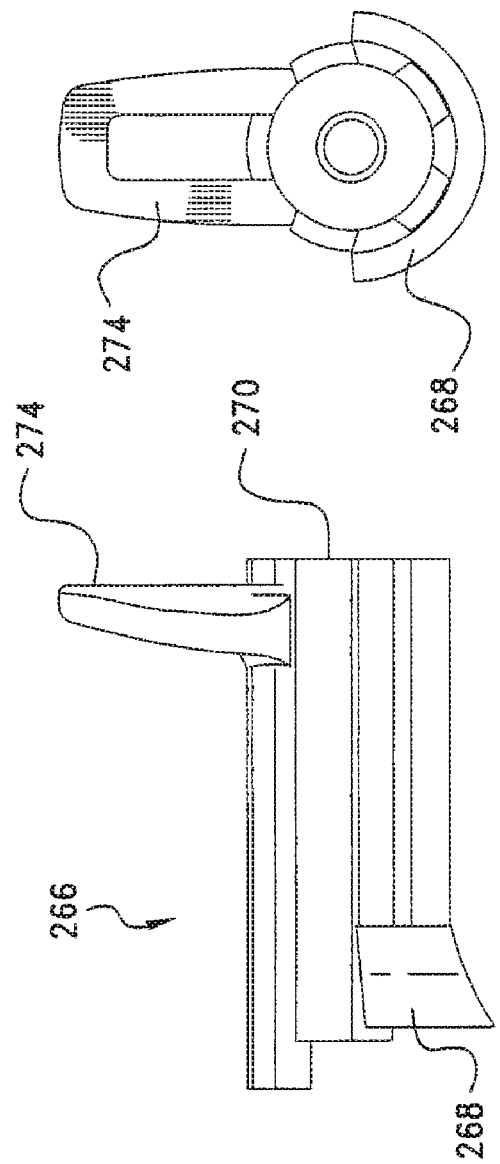
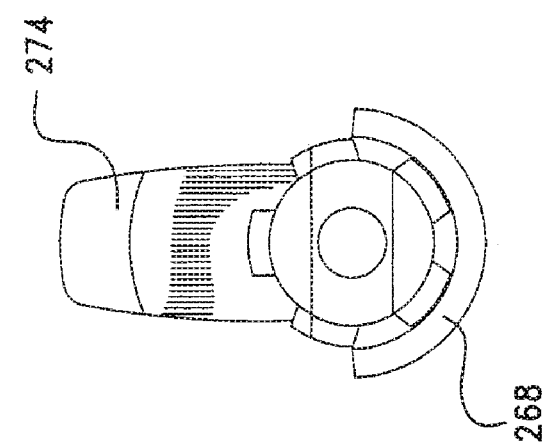
Fig. 27g
Fig. 27f
Fig. 27e

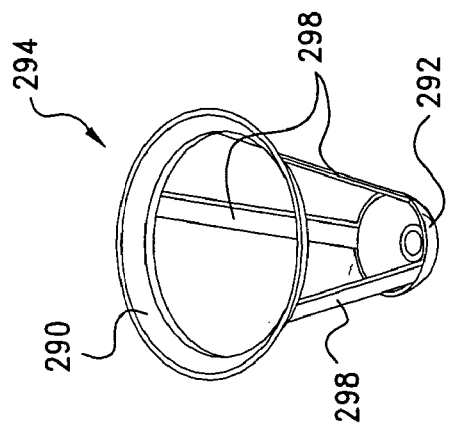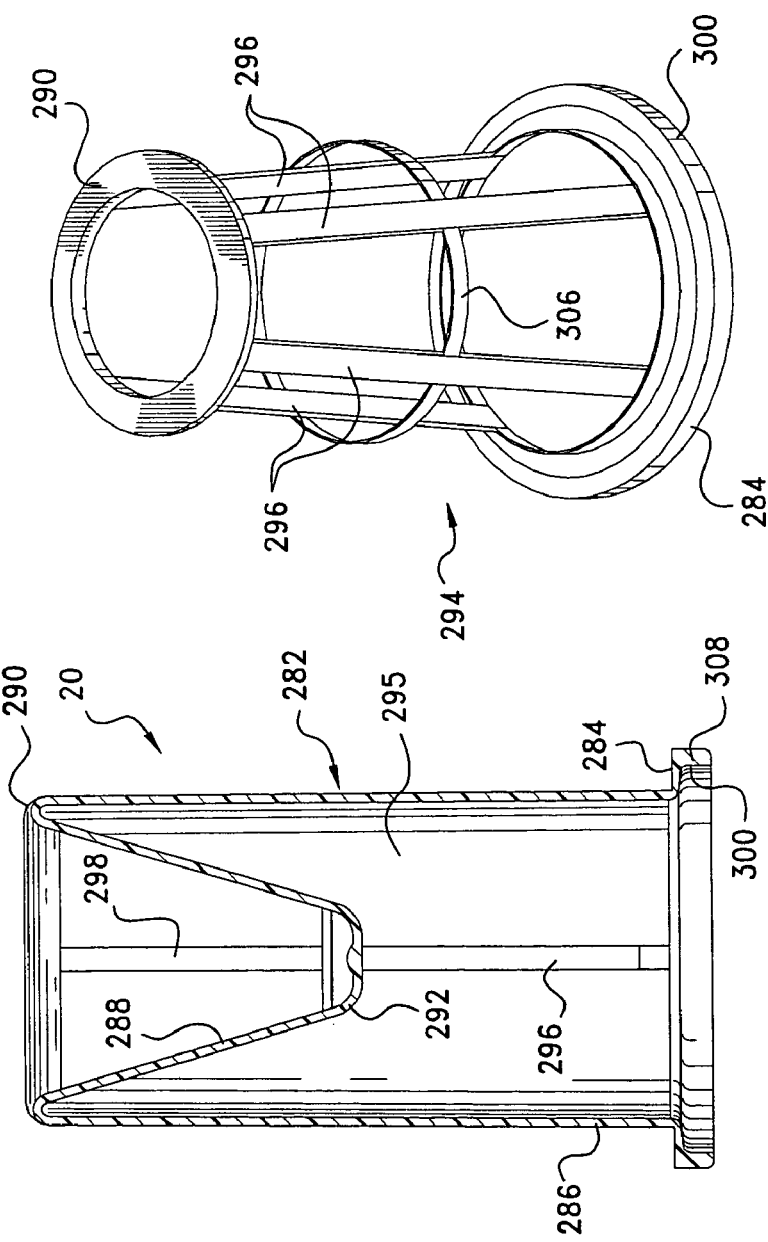

AIR FILTER ASSEMBLY SYSTEM AND METHOD

CROSS-REFERENCE TO RELATED CASES

The present application claims the benefit of the filing date of U.S. patent application Ser. No. 60/549,515, filed Mar. 2, 2004, the disclosure of which is fully incorporated herein by reference.

FIELD OF THE INVENTION

The present invention pertains to an air filter assembly system and in particular to an air filter assembly which has a housing comprised of two abutting cylindrical housing halves that include toothed outer ends and integral semi-cylindrical air inlet portions; a replaceable, primary filter assembly, having a rigid end cap integral with a cylindrical filter pack; a filter outlet end, with a toothed peripheral portion, for slip-fit insertion and angular adjustment relative to either housing end; and a unique replaceable safety filter seated thereon. A separate filter attachment base, with a curved arcuate segment adapted for receiving a housing periphery portion, includes a plurality of spaced support pads and slot portions for angularly adjustably receiving like numbers of T-shaped appendages, on the filter housing, and includes a manually-actuated locking mechanism, for removably joining the housing and attachment base.

BACKGROUND OF THE INVENTION

Air filters or cleaners, while being used in a great variety of applications, are particularly useful for filtering the air prior to its ingestion in internal combustion engines and the like. Typically, an air filter assembly utilizes a primary filter pack assembly located inside a housing, having spaced air inlets and outlets, wherein unfiltered air passes centripetally into a cylindrical main filter element and out of the interior thereof, with undesired particulate material being consequently trapped in the filter medium. Generally, in heavy duty applications, a separate secondary or safety filter is also utilized, for back-up purposes, in case of primary filter pack failure, and is often structured to remain in place while the primary filter element is replaced. This permits greater engine life.

Installation space for such air filter assembly systems, particularly when utilized in mobile applications, such as in trucks and construction equipment or the like, is very limited and access thereto, for maintenance service, such as for the required periodic changing the primary and/or safety filter pack assemblies, is often very tortuous. Thus it is important that such air filter assemblies be versatile in terms of mounting positions, be they horizontal, vertical or therebetween. In addition, the filter housing should have an air inlet opening that is tangent to the housing shape and should be both angularly and rotationally displaceable relative to its mounting base so as to permit both incremental circumferential indexing as well as 180 degree horizontal rotation thereof. In addition, a manually actuated, simple, locking system should permit simple installation, as well as subsequent tool-less removal of both the filter housing and/or the primary filter pack assembly. Ideally, the primary filter assembly should include multiple radial sealing surfaces and be insertable, into the filter housing, from either end thereof. The filtered air outlet end, which should be similarly attachable to either housing end, should also be incrementally rotatable, relative to the filter housing, to permit ready access for the addition or hookup of CCV filter and air flow restriction indicators. The attachment of both the primary filter assembly and the air outlet end, to the housing ends, should be via simple tool-less latches. Such noted relative rotations and indexing, between the housing, the end cover and the primary filter assembly will also permit ready access to an independent, separate, safety filter assembly, for maintenance purposes, and even permit the removal of the entire filter housing assembly, from its installed position or location, without disturbing the outlet attachment to the engine or the CCV attachment, etc. Finally, the several noted filter assembly components should also be of light weight, durable and corrosion as well as heat resistant, together with being relatively easy to manufacture and cost effective.

The patent literature includes a large number of references that pertain to air cleaners, their components and their associated elements, including but not limited to the following, some of which will be discussed in more detail: U.S. Pat. No. 4,135,899 to Gauer; U.S. Pat. Nos. 4,211,543 and 4,243,397 both to Tokar et al.; U.S. Pat. No. 5,013,182 to Coulvonvaux; U.S. Pat. No. 5,064,458 to Machado; U.S. Pat. No. 5,120,337 to Benzler et al.; U.S. Pat. Nos. 5,545,241 and B1 5,545,241 to Vanderauwera et al.; U.S. Pat. No. 6,383,244 B1 to Wake et al.; and published U.S. patent application Ser. No. US 2004/0134171 A1 to Scott et al.

U.S. Pat. Nos. 5,545,241 and B1 5,545,241 to Vanderauwera et al. show a filter assembly mounting bracket comprising a flexible band with radially-inward projecting, spaced blocks, with these blocks being received within corresponding recesses, formed in the filter housing, to rotationally orient and mount the housing, while U.S. Pat. No. 5,013,182 to Coulvonvaux, discloses a spring clasp which allows a filter housing to be rotationally mounted to a support. None of these references, however, show the particular mounting bracket of the present invention which includes a short arcuate segment and a pair of associated grooves that receive T-shaped tabs or abutments on the filter housing, together with a manually actuated locking mechanism to affix the housing to the mounting bracket.

U.S. Pat. No. 6,383,244 B1 to Wake et al. shows a filter combination which has a primary filter element and a safety filter element, both having compressible urethane end caps, with a detent on a housing flange providing a seal and the retention thereof, of the safety filter, when the primary filter is removed. However, in this structure, it is the end pan or cover that securely holds the filter in the housing, and is not an integral part of the filter element. In the present invention, the adhesive that is used to seal the end of the cylindrical filter pack assembly also securely bonds same to the rigid end plate or pan, while, in the reference structure, the adhesive only seals the end of the paper filter and then presses against the end pan when the former is installed in the housing.

None of the cited prior art references are deemed pertain to the combination of features that constitute the structure and function of the present invention.

SUMMARY OF THE INVENTION

Accordingly, in order to overcome the limitations of the prior art devices, the present invention provides an improved air filter assembly system having a shape, functional components and operation that permit ready location, access and maintenance thereof in tight quarters of limited accessibility.

Specifically, in terms of structure, the air filter assembly system of this invention comprises in combination: a. a housing split into abutting, generally cylindrical, housing halves, adapted to be joined at mating peripheral inner ends via a plurality of substantially equally peripherally spaced, opposed, abutting retaining members having opposing lateral recess portions defining T-shaped appendages; b. a cylindrical air inlet, on the housing, formed of transversely directed, abutting, semi-cylindrical air inlet portions, perpendicular to the housing, emanating from opposed curved portions of the housing halves inner ends, the cylindrical air inlet being substantially tangential with the peripheral curvature of the housing; c. a primary filter pack assembly including a basically disc-shaped, rigid, end cap having a diameter, greater than those of housing halves outer ends, and an inwardly depending, perpendicular, peripheral, outer lip of a diameter and axial extent so as to permit a slip-fit insertion of the cap into one of the housing halves outer ends, the end cap also including an inwardly depending, perpendicular, peripheral, inner lip, the lips defining, therebetween, an inner groove adapted to receive as well as fixedly confine and seal, via the addition of an adhesive material, an outer annular end portion of a generally cylindrical primary filter pack, with an inner annular end portion thereof being provided with a sealing material that serves the functions of both an inboard radial seal and an outboard radial seal, relative to a filter outlet end, the primary filter pack assembly, via its attached end cap, being adapted to be removably secured to the one of the housing halves, with the primary filter pack extending into the housing, via a plurality of peripherally spaced first latches attached to the one of the housing halves; d. the filter outlet end being generally annular in shape and having a plurality of coaxial, longitudinally extending annular rib portions, with an outermost diameter rib portion thereof having an inner surface of a diameter and axial extent so as to permit a slip-fit over one of the housing halves outer ends, the plurality of annular rib portions including a radially innermost annular air outlet portion connected to a first radially larger diameter annular rib portion via an annular connecting wall, and second and third successively larger diameter, spaced annular rib portions, with adjacent ones of the outermost, first, second and third rib portions being connected via annular end walls, the outlet end being adapted to be secured to one of the housing halves via one of heating staking or a plurality of peripherally spaced second latches attached to another one of the housing halves and; e. a safety filter assembly having a generally truncated cone-shaped body with an annular base at one end and an inverted, generally conical, inwardly directed, recessed portion attached to another end of the body, the safety filter assembly being adapted to be inserted into the filter outlet end, with the safety filter annular base being sealingly received within the outlet end first radially larger diameter annular rib portion and the safety filter assembly extending into the housing and therein, being held in place by and within the primary filter pack; and f. a filter attachment base assembly including a base frame with perpendicularly spaced side plates having, on their upper surfaces, a radially curved first bed portion, having a first radius of curvature, the first bed portion including a plurality of similarly curved, lateral, support pads, with integrated vertical stop portions, the support pads being separated via intermediate spacings, the base frame including a radially curved second bed portion having a second radius of curvature slightly greater than that of the first bed portion, the first and second bed portions, together with the spaced support pads and stop portions, defining, therebetween, a plurality of spaced, curved slot portions, the filter attachment base assembly further including a locking mechanism having a lock pin rotatable into the space between the first and second bed portions, the housing being adapted to be joined to the filter attachment base assembly by positioning the housing so that a plurality of the T-shaped appendages, after being lined up with successive ones of the intermediate spacings between the first bed support pads, enter the curved slot portions, with rotation of the housing causing the support pads to enter the opposed recess portions of the T-shaped appendages and, continuing the rotation until the support pad stop portions abut one side of the appendages and, thereafter rotating the locking mechanism until the lock pin operatively engages another side of one of the appendages.

In one variation, the pluralities of T-shaped appendages are formed on the housing halves mating peripheral inner ends at predetermined first angular increments, wherein the first angular increments are about 20 degrees, with the first angular increments having a peripheral extent of about 240 degrees, thus including a total of thirteen of the T-shaped appendages.

In another variation, when the housing is secured to the filter attachment base assembly, the T-shaped appendages permit the angular adjustment of the housing, relative to the filter attachment base assembly, in 20 degree increments through about 200 degrees of rotation and, when the housing is locked in place, on the filter attachment base assembly, five of the T-shaped appendages are operatively engaged with the support pads of the filter attachment base assembly.

In a further variation, each of the housing halves includes, at its peripheral outer end, a multiplicity of equally peripherally spaced, in predetermined second angular increments, female gear teeth, wherein the second angular increments have an extent of about 10 degrees and extend about the total periphery of each of the housing outer ends. Preferably the housing halves are substantially allochiral.

In a differing variation, the cylindrical air inlet is located at the longitudinal center of the housing; is substantially tangent with the peripheral curvature of one side of the housing; and of a diameter smaller than that of the housing, wherein incremental rotation of the housing, for 180 degrees longitudinally, successively places the air inlet on one of a first end, a first side, a second end and a second side, respectively, of a longitudinal center line of the housing. Defining same slightly differently, rotation of the housing 180 degrees longitudinally, places the air inlet on either end or either side of a longitudinal center line of the housing, as desired.

In yet another variation, each of the pluralities of peripherally spaced first and second latches, attached to the housing halves, takes the form of an over-center wire clip assembly.

In still another variation, the base frame and the side plates, of the filter attachment base assembly, include a plurality of elongated slots, for mounting members, to permit ready mounting thereof to a support structure. Preferably, the filter attachment base assembly includes six curved slot portions, thereby permitting the insertion thereinto of five adjoining ones of the T-shaped appendages of the housing.

In yet a differing variation, the filter attachment base assembly locking mechanism includes: i. a boss portion, with an axial through bore, having spaced inboard and outboard end faces, the latter including one of a first plurality of detent recessed and detent raised portions; ii. a lock lever having a first shaft portion adapted to be inserted into the axial through bore and a handle portion at one end thereof, the lock lever including a second plurality of one of detent raised and detent recess portions, adapted to operatively engage opposing ones of the first plurality of the detent portions at predetermined angular positions; and iii. a second shaft portion, attached to another end of the first shaft portion, having a tension member on the proximate end thereof and a radial lock pin on a distal end thereof, the tension member acting against the inboard end of the boss portion to maintain tension, relative to the lock lever first shaft portion, thereby preventing undesired movement of the lock lever out of an unlocked position.

Preferably, the tension member takes the form of a semi-flexible, half moon shaped, semi cylindrical protrusion and the lock lever further includes a stop member to prevent the rotation of the lock lever beyond a predetermined angular extent.

In one of the previous variations, the outermost diameter portion of the filter outlet end includes, on its inner peripheral surface, a multiplicity of equally peripherally spaced, in predetermined angular increments, transverse male gear teeth adapted to engage with the multiplicity of female gear teeth of one of the housing halves outer ends, with the predetermined angular increments having an extent of about 10 degrees and extending around the total periphery of each of the housing outer ends. These pluralities of engaged male and female gear teeth permit angular, adjustable, positioning of the filter outlet end and one of the housing halves, relative to each other, in 10 degree increments.

In an additional variation, the annular connecting wall, between the radially innermost air outlet portion and the first radially larger diameter annular rib portion of the filter outlet end, takes the form of a flared annular connecting wall, the latter providing a curved, smooth, transition for air emanating from the air filter assembly system.

In still a further variation, in the filter outlet end, the third of the plurality of an annular rib portion, adjoining the radially outermost rib portions, and the second of the annular rib portions, adjoining the third rib portion, define an annular groove therebetween for sealingly receiving the annular inner end portion of the primary filter pack. Preferably, the inner peripheral surface of the third rib portion and the outer annular surface of the second rib portion serve as radial seal surfaces for the annular inner end portion of the primary filter pack. In addition, in the filter outlet end, an inner peripheral surface of the first radially larger diameter annular rib portion serves both as a locating and peripheral seal surface for the annular base of the safety filter assembly, with the diameter of the filter outlet end annular air outlet portion being smaller than that of the cylindrical air inlet.

The outlet end of the previous variation further includes an apertured first boss portion, radially extending outwardly from the innermost annular air outlet portion for a radial extent greater than that of the outermost diameter rib portion, with the filter outlet end further including an apertured second boss portion, substantially parallel with the first boss portion, extending outwardly from the innermost annular air outlet portion to about the outermost diameter rib portion, the first and second rib portions serving as attachment points for one of crankcase ventilation and filter restriction indicators.

In still a differing variation, a maximum diameter portion, of the end cap of the primary filter pack assembly, is slightly greater than that of the peripheral outer lip and includes opposed, radially flared portions that function as operator handles during installation and removal of the primary filter pack assembly into and from the air filter assembly system. The end cap further includes a central domed area and a plurality of radially inwardly directed, contoured, spiraling arms, together with a plurality of spaced outwardly directed protrusions with undercuts, the spiraling arms and protrusion undercuts, in conjunction with the interposed adhesive material, adding both a mechanical attachment of the primary filter pack to the end cap and resisting any undesired radial twisting of the primary filter pack relative to the end cap. The adhesive material is preferably comprised of an adhesive type of urethane having a free rise density of about 30-40 lb/cu.ft. and a Shore "A" hardness of about 60 minimum. In addition, the sealing material, on the inner annular end portion of the primary filter pack, is preferably comprised of a foaming type of urethane having a free rise density of about 22-25 lb/cu.ft. and a Shore "A" hardness of about 50, the foaming type urethane serving the dual functions of sealing the primary filter pack inner annular end portion as well as providing radial inner and outer seals relative to the filter outlet end second and third rib portions, respectively.

In an again differing version, the primary filter pack assembly end cap maximum diameter portion further including, on its inner peripheral annular surface, a plurality of spaced, recessed, radially directed slots, the slots allowing any water, trapped within the air filter assembly, to drain therefrom during periods of non-use thereof.

In an additional variation, the safety filter assembly is comprised of a felt type material filter medium enveloped and retained by an open, lattice type space frame and the felt type medium is comprised of needlepunched polyester medium having a Frazier Air Permeability of about 300 CFM per square foot at 0.5 inches of water. Preferably, the lattice type space frame is comprised of a glass filled nylon material, wherein the lattice type space frame is over molded onto the polyester medium. Furthermore, an annular peripheral sealing ring portion of the annular base, comprised of the felt type medium, is adapted to sealingly abut an inside peripheral surface of the first radially larger diameter annular rib portion of the filter outlet end.

Another embodiment of this invention comprises in combination: a. a housing split into abutting, generally cylindrical, housing halves, adapted to be joined at mating peripheral inner ends via a plurality of substantially equally peripherally spaced, opposed, abutting retaining members having opposing lateral recess portions defining T-shaped appendages, each housing half also being provided, at its peripheral outer end, with a multiplicity of equally peripherally spaced, in predetermined first angular increments, transverse female gear teeth; b. a cylindrical air inlet, on the housing, formed of transversely directed, abutting, semi-cylindrical air inlet portions, perpendicular to the housing, emanating from opposed curved portions of the housing halves inner ends, the cylindrical air inlet being substantially tangential with the peripheral curvature of the housing; c. a primary filter pack assembly including a basically disc-shaped, rigid, end cap having a diameter, greater than those of housing halves outer ends, and an inwardly depending, perpendicular, peripheral, outer lip of a diameter and axial extent so as to permit a slip-fit insertion of the cap into one of the housing halves outer ends, the end cap also including an inwardly depending, perpendicular, peripheral, inner lip, the lips defining, therebetween, an inner groove adapted to receive as well as fixedly confine and seal, via the addition of an adhesive material, an outer annular end portion of a generally cylindrical primary filter pack, with an inner annular end portion thereof being provided with a sealing material that serves the functions of both an inboard radial seal and an outboard radial seal, relative to a filter outlet end, the primary filter pack assembly, via its attached end cap, being adapted to be removably secured to the one of the housing halves, with the primary filter pack extending into the housing, via a plurality of peripherally spaced first latches attached to the one of the housing halves; d. the filter outlet end being generally annular in shape and having a plurality of coaxial, longitudinally extending annular rib portions, with an outermost diameter rib portion thereof having an inner surface of a diameter and axial extent so as to permit a slip-fit over one of the housing halves outer ends, the outermost diameter portion including, on its inner peripheral surface, a multiplicity of equally peripherally spaced, in predetermined second angular increments, transverse male gear teeth adapted to mate with the female gear teeth of one of the housing halves outer ends; the plurality of annular rib portions including a radially innermost annular air outlet portion connected to a first radially larger diameter annular rib portion via a flared, annular connecting wall, and second and third successively larger diameter, spaced annular rib portions, with adjacent ones of the outermost, first, second and third rib portions being connected via annular end walls, the outlet end being adapted to be removably secured to one of the housing halves via a plurality of peripherally spaced second latches attached to one of the housing halves; and e. a safety filter assembly having a generally truncated cone-shaped body with an annular base at one end and an inverted, generally conical, inwardly directed, recessed portion attached to another end of the body, the safety filter assembly being comprised of a felt-type filter medium enveloped and retained by a lattice type space frame, the safety filter assembly being adapted to be inserted into the filter outlet end, with the safety filter annular base being sealingly received within the outlet end first radially larger diameter annular rib portion and the safety filter assembly extending into the housing and therein, being held in place by and within the primary filter pack.

A first variation further includes a filter attachment base assembly including a base frame with perpendicularly spaced side plates having, on their upper surfaces, a short arcuate first bed portion, having a first radius of curvature, the first bed portion including a plurality of similarly curved, lateral, support pads, with integrated vertical stop portions, the support pads being separated via intermediate spacings, the base frame including a short arcuate second bed portion having a second radius of curvature slightly greater than that of the first bed portion, the first and second bed portions, together with the spaced support pads and stop portions, defining, therebetween, a plurality of spaced, curved slot portions, the filter attachment base assembly further including a locking mechanism having a lock pin rotatable into the space between the first and second bed portions, the housing being adapted to be joined to the filter attachment base assembly by positioning the housing so that a plurality of the T-shaped appendages, after being lined up with successive ones of the internal spacings between the first bed support pads, enter the curved slot portions, with rotation of the housing causing the support pads to enter the opposed recess portions of the T-shaped appendages and, continuing the rotation until the support pad stop portions abut one side of the appendages and, thereafter rotating the locking mechanism until the lock pin operatively engages another side of one of the appendages.

In the previous variation, the first angular increments are about 20 degrees and have a total peripheral extent of about 240 degrees. When the housing is secured to the filter attachment base assembly, the T-shaped appendages permit the angular adjustment of the housing, relative to the filter attachment base assembly, in about 20 degree increments, through about 200 degrees of rotation. The predetermined first and second angular increments of the gear teeth preferably have an angular extent of about 10 degrees and permit angular, adjustable, positioning of the filter outlet end, at either of the housing halves, relative to one another, in about 10 degree increments. In addition, the incremental longitudinal rotation of the housing, relative to the attachment base assembly, for 180 degrees, successively places the air inlet on one of a first end, a first side, a second end and a second side, respectively of a longitudinal center line of the housing.

In the noted further embodiment, the locking mechanism includes: i. a boss portion, with an axial through bore, having spaced inboard and outboard end faces, the outboard end face including a plurality of detent recesses; ii. a lock lever having a first shaft portion inserted into the axial through bore and having a handle portion at one end thereof, the lock lever including a plurality of detent raised portions adapted to operatively engage the detent recesses at predetermined angular positions of the first shaft portion relative to the boss portion; and iii. a second shaft portion, attached at one end to another end of the first shaft portion, the second shaft portion having a tension member at the one end and a radial locking pin on another end thereof, the tension member acting against the boss portion inboard end to maintain tension, relative to the lock lever first shaft portion.

In another variation, in the filter outlet end, the third annular rib portion, adjoining the radially outermost rib portion, and the second rib portion, adjoining the third rib portion, define, therebetween, an annular groove for sealingly receiving the annular inner end portion of the primary filter pack. Furthermore, in the filter outlet end, an inner peripheral surface of the first radially larger rib portion serves as both a locating and peripheral seal surface for the annular base of the safety filter assembly.

In a differing variation, the cap end of the primary filter pack assembly further includes, at a maximum diameter portion thereof, a pair of opposed, radially extending operator handle portions.

In a still further variation, the safety filter assembly lattice type space frame is preferably comprised of a glass filled nylon material that is over molded onto the felt material which is comprised of a polyester medium and the polyester medium is preferably comprised of an about 15.0-denier needlepunched polyester medium having a Frazier Air Permeability of about 300 CFM per square foot at 0.5 inches of water.

Another embodiment of this invention pertains to a method of manufacturing a safety filter assembly, comprised of a structural, open lattice type reinforcing material overlaying a felt-type filter medium, the assembly having the form of a generally truncated cone-shaped main body with an annular base at one end and an inverted, generally conical, inwardly directed, recessed portion joined at another end of the body, the method of manufacturing comprising the steps of: a. die cutting and forming the filter medium, for the recessed portion, into a generally conical shape; die cutting and forming the filter medium, for the main body into a generally truncated cone shape; and die cutting the filter medium, for the annular base, into a flat, circular disc shaped part; b. placing the shaped conical portion in a first injection mold, closing the first mold and clamping the conical portion; c. injecting the reinforcing material into the first mold thereby encapsulating the conical portion by forming thereon an open, lattice type frame; d. placing the encapsulated conical portion into a second injection mold, in an inverted position; e. further placing the truncated cone main body, together with the circular disc shaped part, into the second injection mold, closing the second mold and clamping the placed parts; and f. further injecting reinforcing material into the second mold thereby encapsulating and uniting the paced parts by forming thereon an open, lattice type frame.

A variation of this method of manufacturing a safety filter assembly further includes the step of: g. forming, as part of the further placing and injection steps, the main body annular base, together with an integral, circumferential peripheral sealing ring thereon. The structural reinforcing material is preferably comprised of a glass filled nylon type material and the felt type filter medium is preferably comprised of a polyester medium, the polyester medium being comprised of an about 15.0-denier needlepunched medium having a Frazier Air Permeability of about 300 CFM per square foot at 0.5 inches of water and having a thickness of about 0.080 inches.

The previously-described advantages and features, as well as other advantages and features, will become readily apparent from the detailed description of the preferred embodiments that follow.

BRIEF DESCRIPTION OF THE DRAWINGS

FIG. 4 is a plan view of the right end of FIG. 3;

FIG. 5A is a top plan view of the left or male housing half of the air filter housing assembly of this invention;

FIG. 5B is a top plan view of the right or female housing half of the air filter housing assembly;

FIG. 7A is a perspective view of one of the over-center wire clip assemblies of the present invention;

FIG. 7B is a side view of the clip assembly of FIG. 7A;

FIG. 8C is a sectional view taken along line 8C-8C of FIG. 8A;

FIG. 8D is a detail of the circled area of FIG. 8C;

FIGS. 27E, 27F and 27G are side, front and rear views, respectively, of the lock lever second shaft position;

FIG. 30 is a longitudinal cross sectional view, taken along line 30-30 of FIG. 29;

FIG. 31 is a perspective view of reinforcing rib structure of the main body of the safety filter assembly; and FIG. 32 is a view, similar to that of FIG. 31, but pertaining to the conical recessed portion of the safety filter assembly.

DETAILED DESCRIPTION OF THE INVENTION

Figure 1:
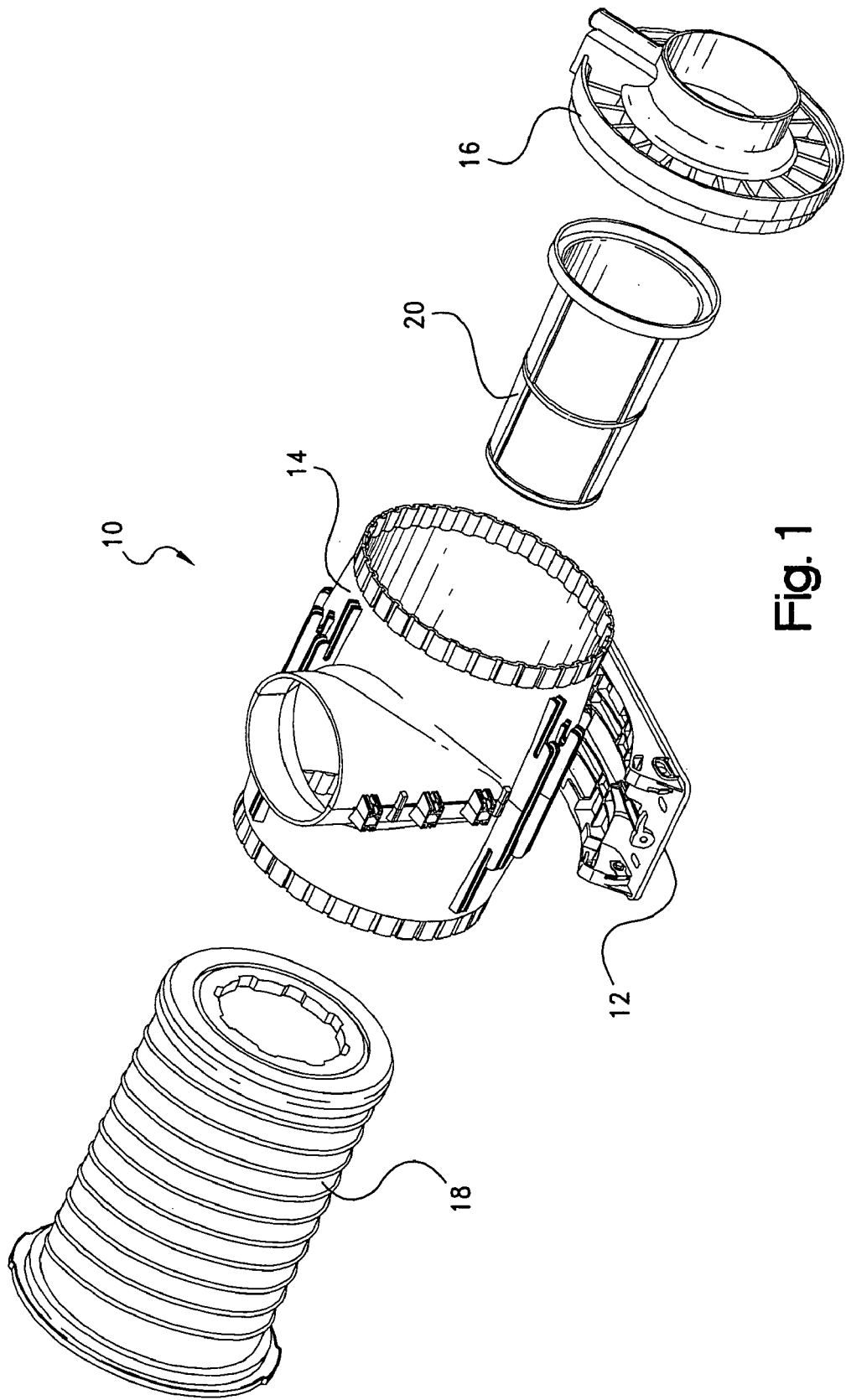
FIG. 1 is an exploded perspective view of the air filtration system of the present invention.

Referring now to the several drawings, illustrated in FIG. 1 is an exploded, perspective, view of the air filter assembly system, generally indicated at 10, of this invention. Air filter assembly system 10 primarily includes a filter attachment base assembly 12, a filter housing assembly 14, an outlet end 16, a primary filter pack assembly 18 and a safety filter assembly 20, all of which will be discussed in greater detail hereinafter.

Figure 2:
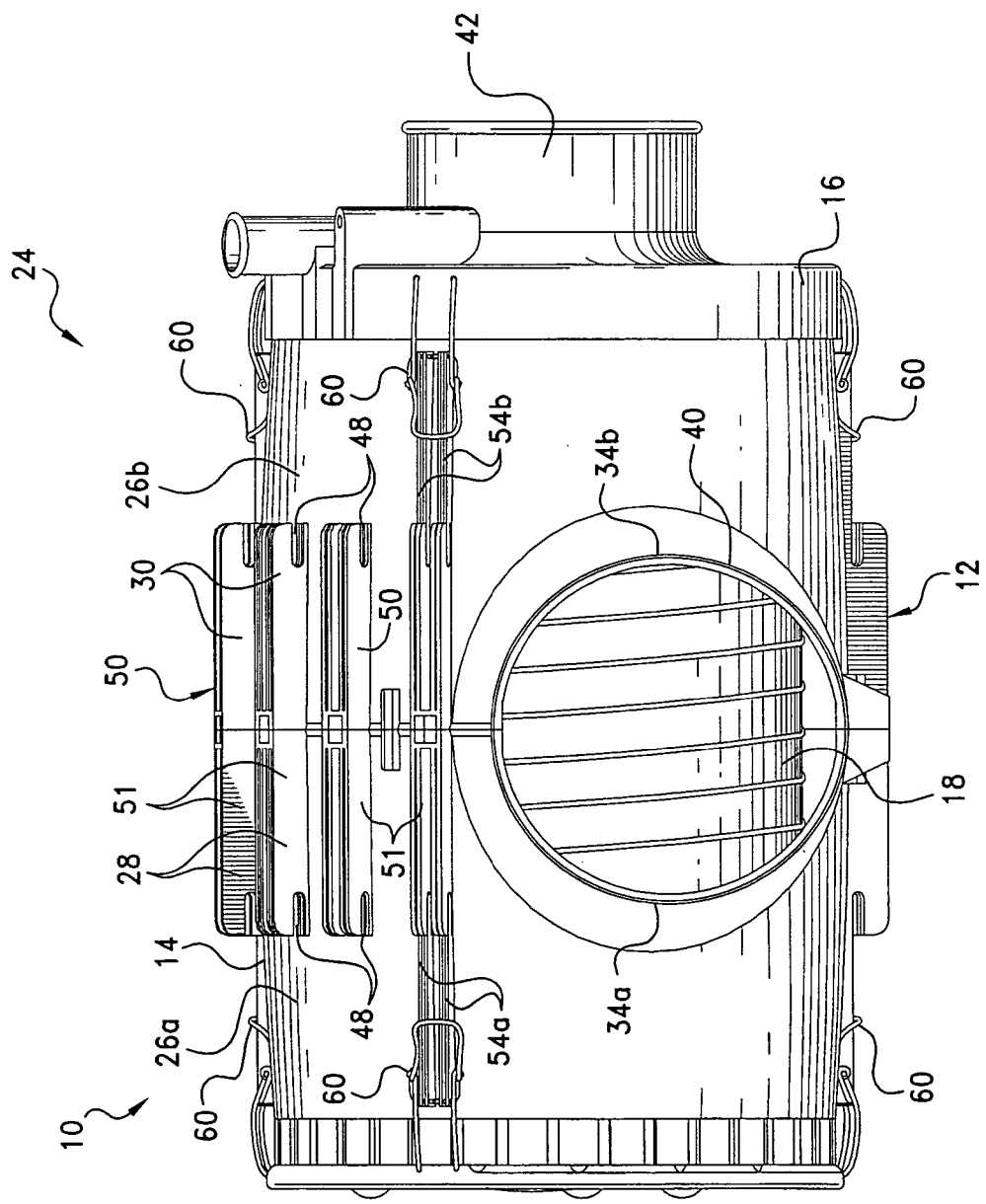
FIG. 2 is a top plan view of the air filtration system of the present invention in the assembled condition.
Figure 3:
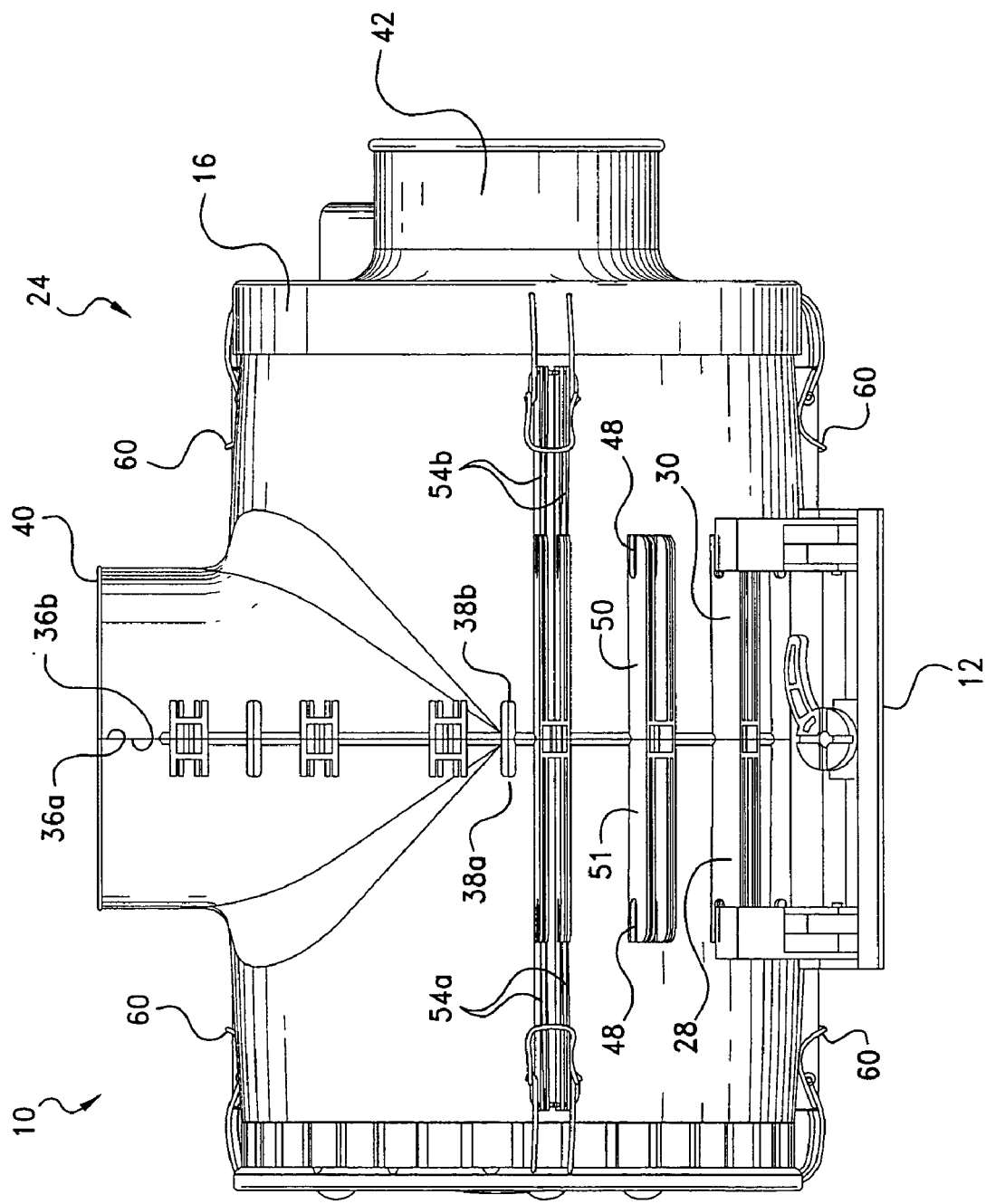
FIG. 3 is a side view of FIG. 2.
Figure 6B:
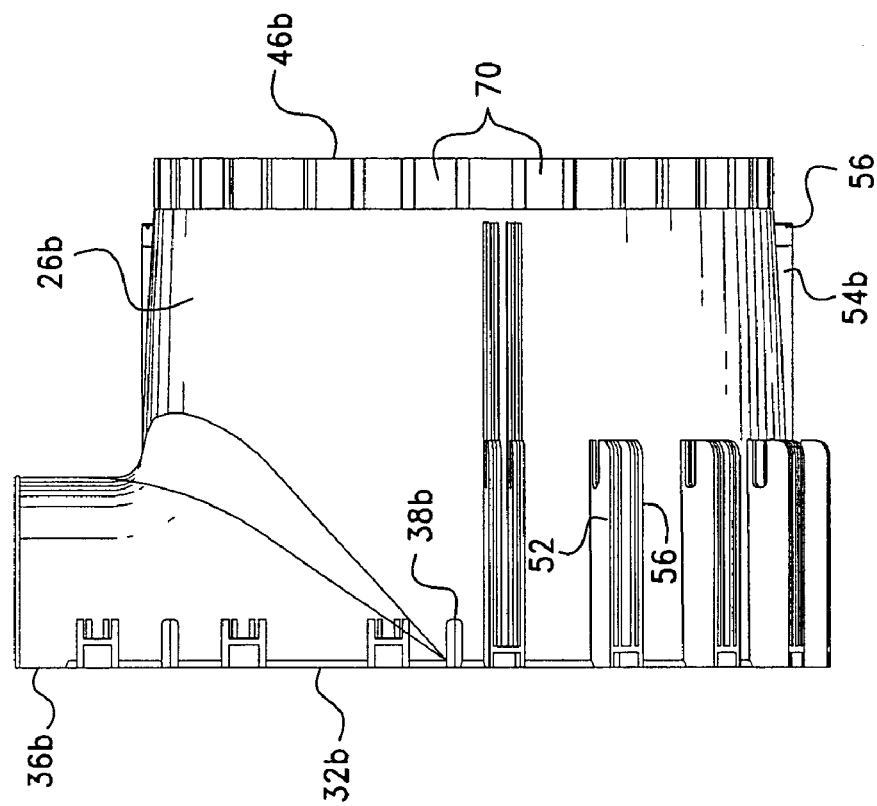
FIG. 6B is a side view of the right housing half of FIG. 5B.
Figure 6A:
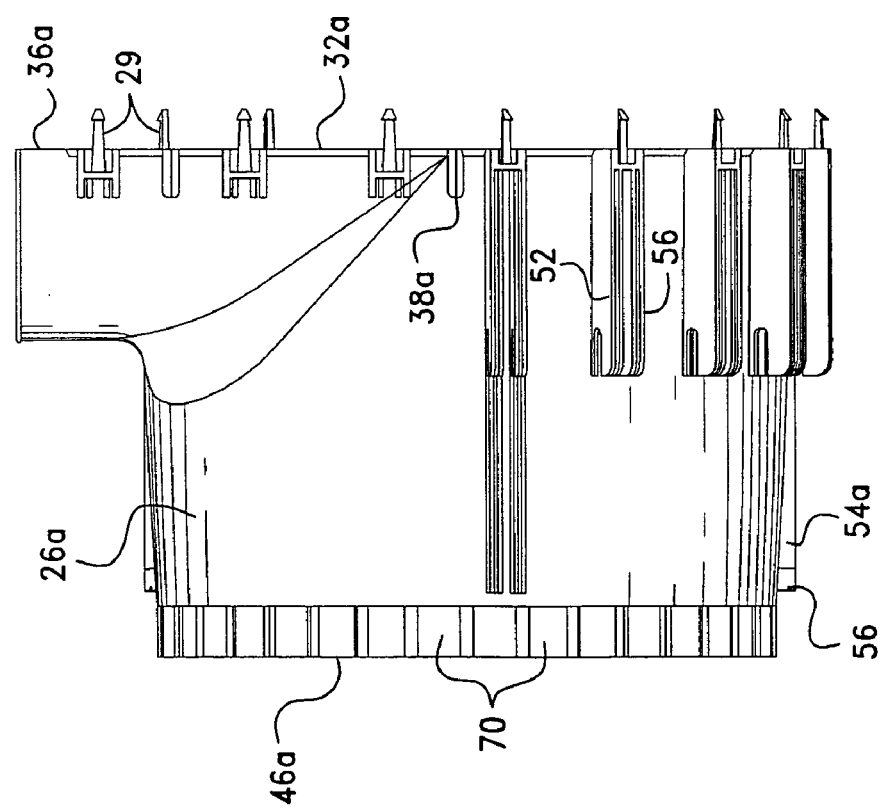
FIG. 6A is a side view of the left housing half of FIG. 5A.

Illustrated in FIGS. 2-4, is the fully assembled air filter assembly system 10 which can also be defined as the combination of attachment base assembly 12 with an air filter assembly 24, the latter being comprised of filter housing assembly 14, outlet end 16, together with primary and safety filter assemblies 16, 18, respectively. FIG. 2 is a top plan view of air filtration assembly 10, while FIG. 3 is a side view and FIG. 4 is an end view thereof.

As best seen in FIGS. 5-9, filter housing assembly 14 is basically comprised of two mating, generally cylindrical, substantially allochiral or mirror-image housing halves 26a, 26b, that are adapted to be joined at their inner or opposing peripheral ends 32a, 32b, respectively, via a plurality of hook or barbed members 29 on peripherally or circumferentially spaced retaining members 28, on housing half 26a, that are adapted to lockingly and engagingly mate with retaining members 30 after passing through correspondingly located apertures 31 (best seen in FIGS. 9D and 9E) on members 30 on housing half 26b, all of which will be described in more detail later. Each of housing halves 26a, 26b, also includes, on its respective inner peripheral end, 32a, 32b, a respective transversely directed, semi-cylindrical or semicircular air inlet portion 34a, 34b that is tangential relative to the curvature of housing halves 26a, 26b, as best seen in FIGS. 8A and 9A. Upon the abutment of housing half inner edge portions 32a, 32b and air inlet edge portions 36a, 36b, there is formed a generally circular cross sectioned air inlet 40, best seen in FIGS. 2 and 3. Air inlet 40 has a predetermined diameter that is considerably less than that of diameter of air filtration assembly 24 and greater than the predetermined diameter of the concentric outlet portion 42 of outlet end 16, as best seen in FIG. 2.

Filter assembly housing 14 may be constructed of injection molded, preferably of a glass filled nylon 6 type of material. Assembly housing 14 has its air inlet portion 40, formed of semi-cylindrical inlet portions 34a, 34b, located on a vertical center line defined by the inner peripheral housing ends 32a, 32b, (FIGS. 5, 6). In the alternative, air inlet portion 40 may be located off center, such as for example, a distance of 2.5 inches (or more or less) toward either the outer end 46a, 46b, (FIGS. 5A, 5B) of housing halves 26a, 26b, so as to produce shorter or longer housing assemblies, if required, by the desired filter capacity.

Figure 8B:
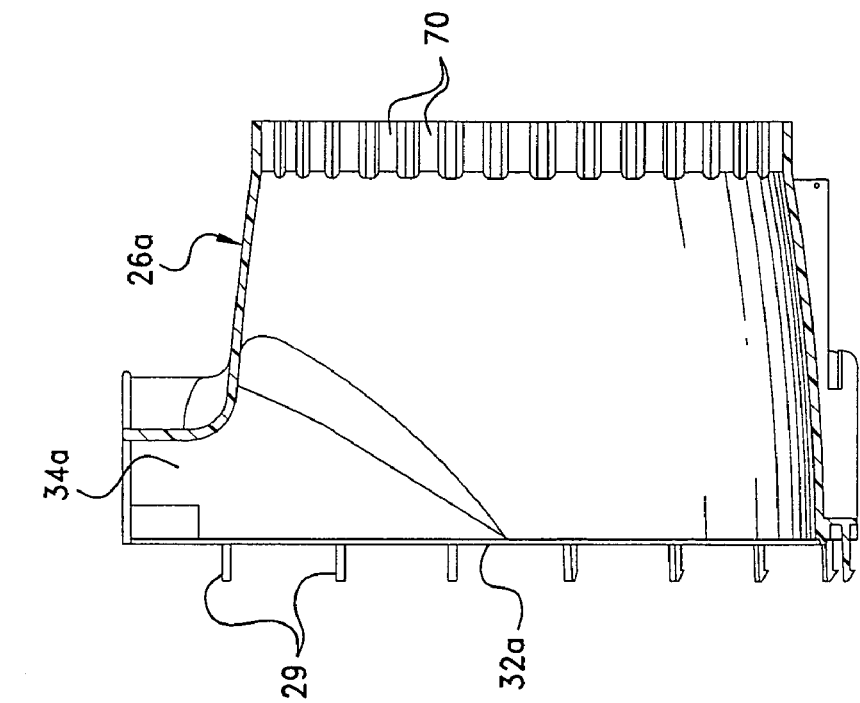
FIG. 8B is a sectional view taken along line 8B-8B of FIG. 8A.
Figure 8A:
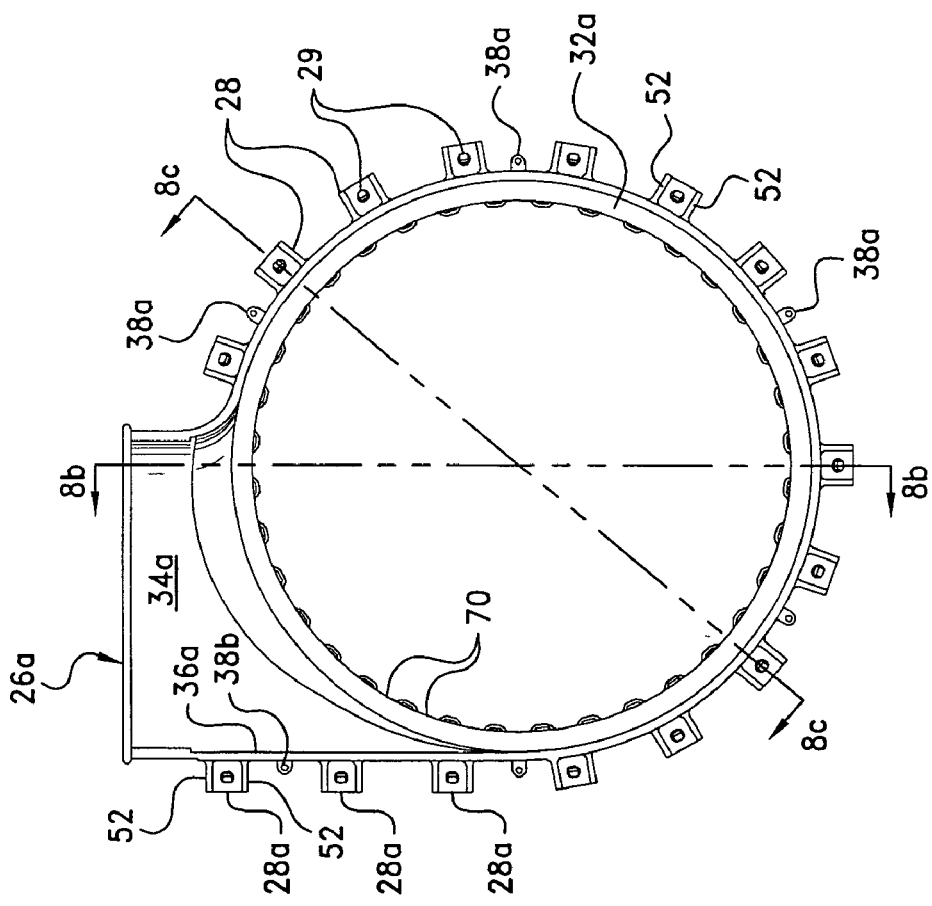
FIG. 8A is a view of the inner end of the left housing half of FIG. 6A.
Figure 9B:
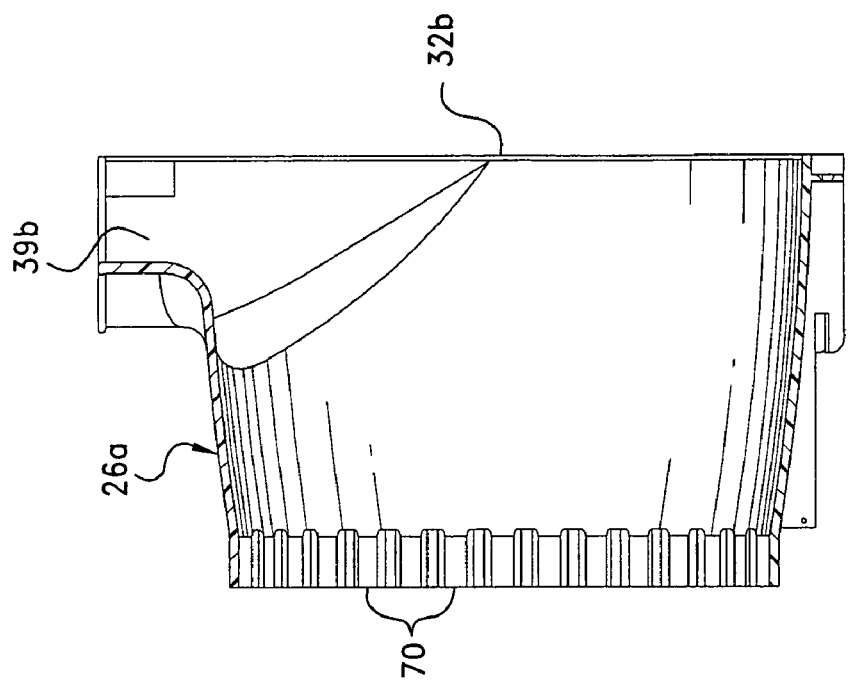
FIG. 9B is a sectional view taken along line 9B-9B of FIG. 9A.
Figure 9A:
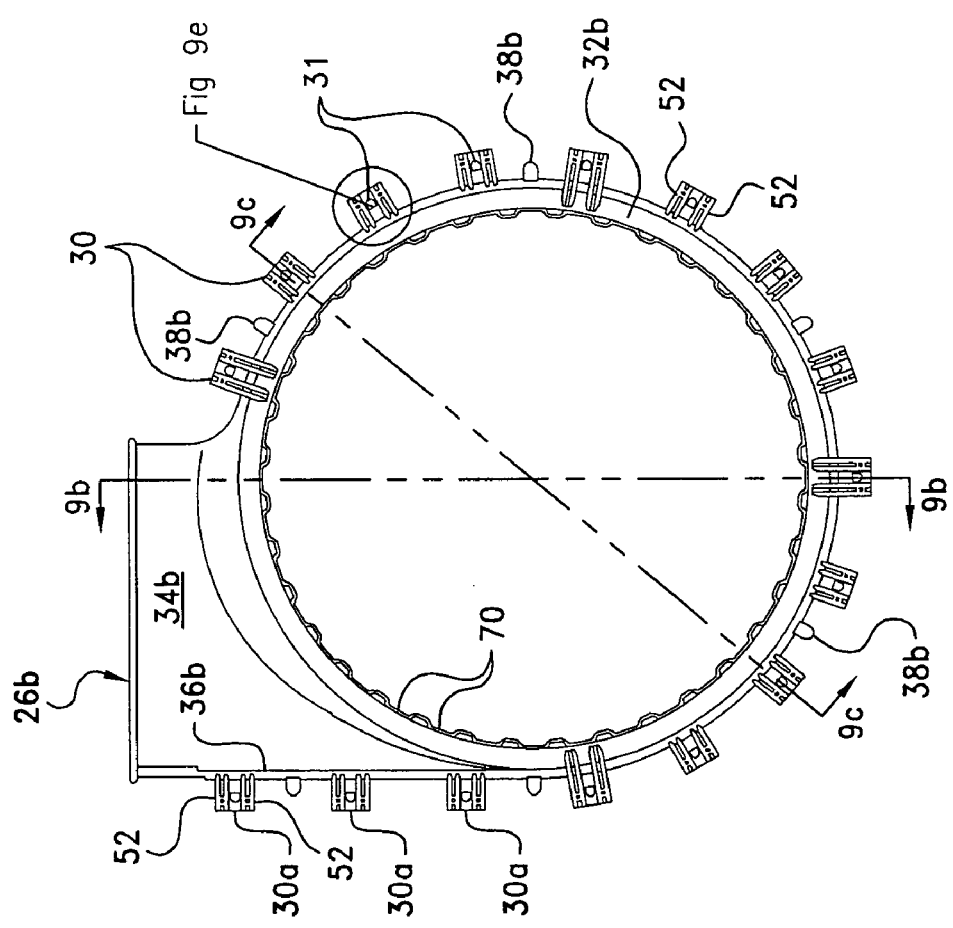
FIG. 9A is a view of the inner end of the left housing half of FIG. 6B.
Figure 9D:
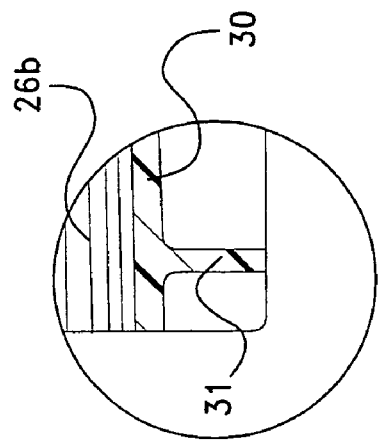
FIG. 9D is a detail of the circled area of FIG. 9C.
Figure 9E:
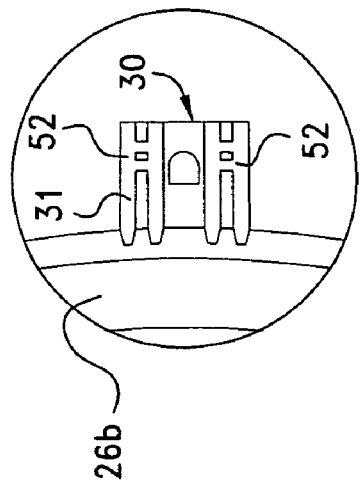
FIG. 9E is a detail of the circled area of FIG. 9A.
Figure 9C:
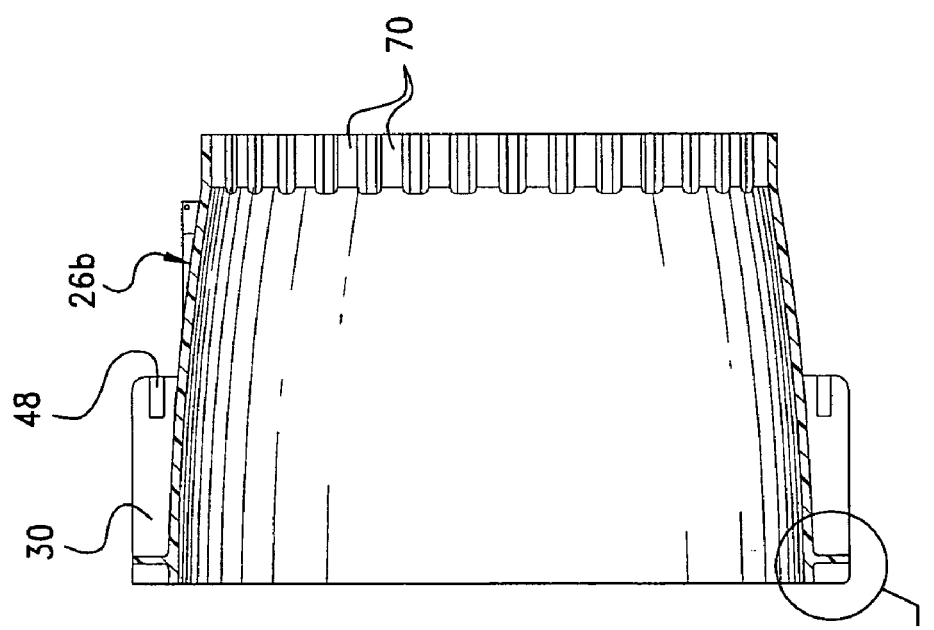
FIG. 9C is a sectional view taken along line 9C-9C of FIG. 9A.

As best seen in FIGS. 8A and 9A, the pluralities of opposed retaining members 28 and 30 are peripherally spaced on adjoining housing inner ends 32a, 32b, while retaining members 28a and 30a are spaced on opposing edge portions 36a, 36b, of air inlet portions 34a, 34b. FIGS. 2 and 3 show that abutting and aligned retainer members 28, 30 each include an outer lateral recess portion 48, thus producing T-shaped appendages 50. FIGS. 8A, 9A show that retainer members 28, 30, are located around housing inner ends 32a, 32b, every 20 degrees for a circumferential extent of about 240 degrees, or a total of 13 T-shaped appendages 50 (FIGS. 2-4) which permit angular or circumferential adjustment, of air filter housing assembly 14, relative to filter attachment base assembly 12, as will be explained in detail later, in 20 degree increments through 200 degrees of rotation. Again, as will be detailed later, when filter housing assembly 14 is locked in place at filter attachment base assembly 12, five of the T-shaped appendages 50 are operatively engaged with filter attachment base assembly 12. Retaining members 28a, 30a, on air inlet portions 34a, 34b, respectively, upon assembly have hook or barbed portions 29 passing through retainer member apertures 31 to engage with retaining member 30. As best seen in FIGS. 8A and 9A, each housing half 26a, 26b, is also provided with a plurality, such as six, circumferentially spaced, opposed, apertured boss portions 28a, 28b. As part of the finalization of the assembly or joining of housing halves 26a, 26b, aligned apertured boss portions 38a, 38b, are joined together via individual fasteners (not shown), such as conventional trilobular screws for plastic materials, which, upon being fully tightened, cause hook portions 29 to firmly engage with apertures 31.

Figure 10:
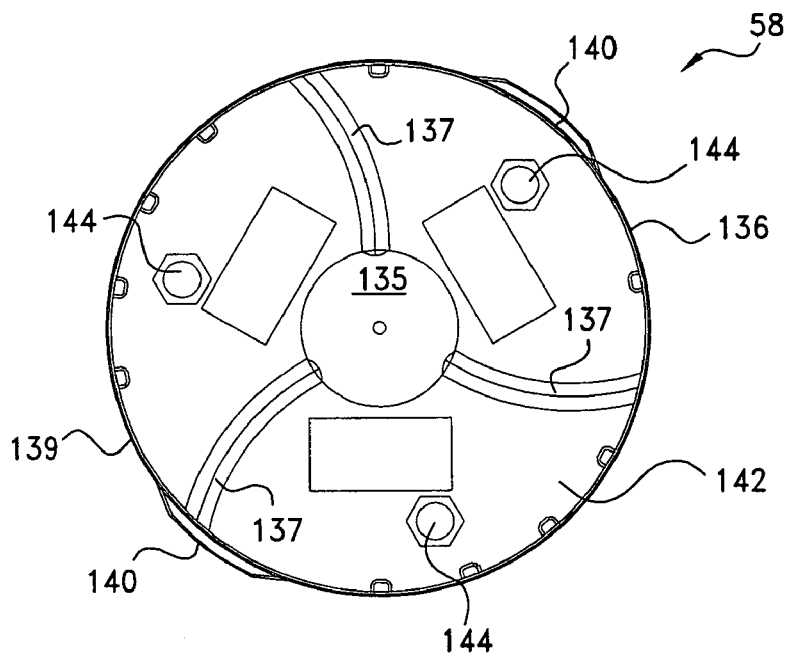
FIG. 10 is a plan view of the top or outer surface of an end pan for the air filtration system of the present invention.
Figure 12:
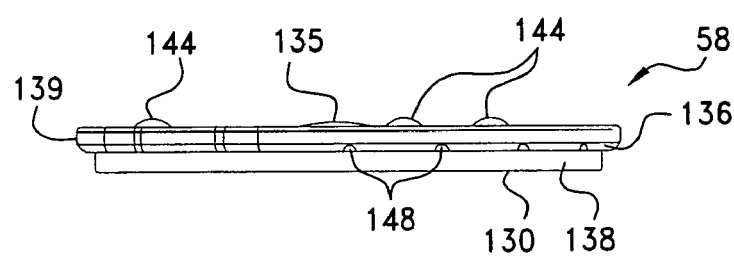
FIG. 12 is a side view of the end pan of FIG. 10.
Figure 11:
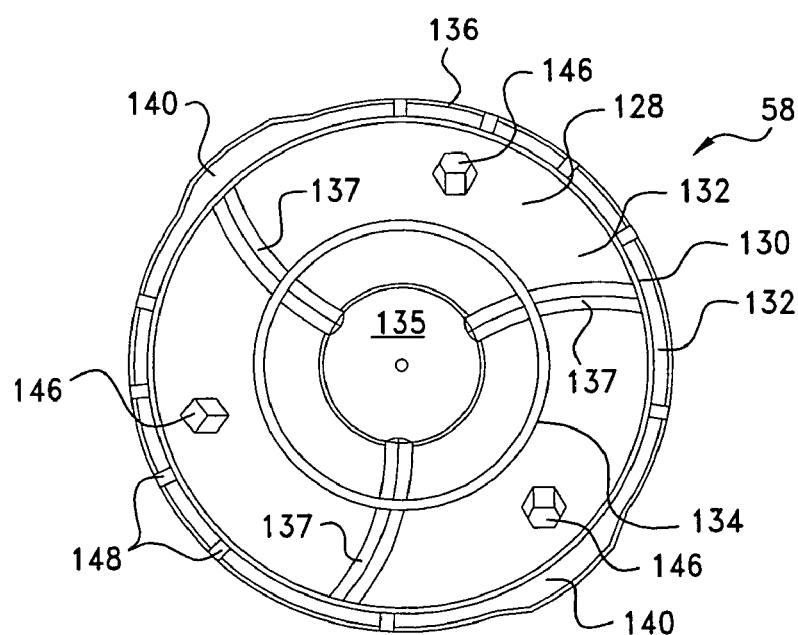
FIG. 11 is a plan view of the bottom or inner surface of the end pan of FIG. 10.
Figure 13:
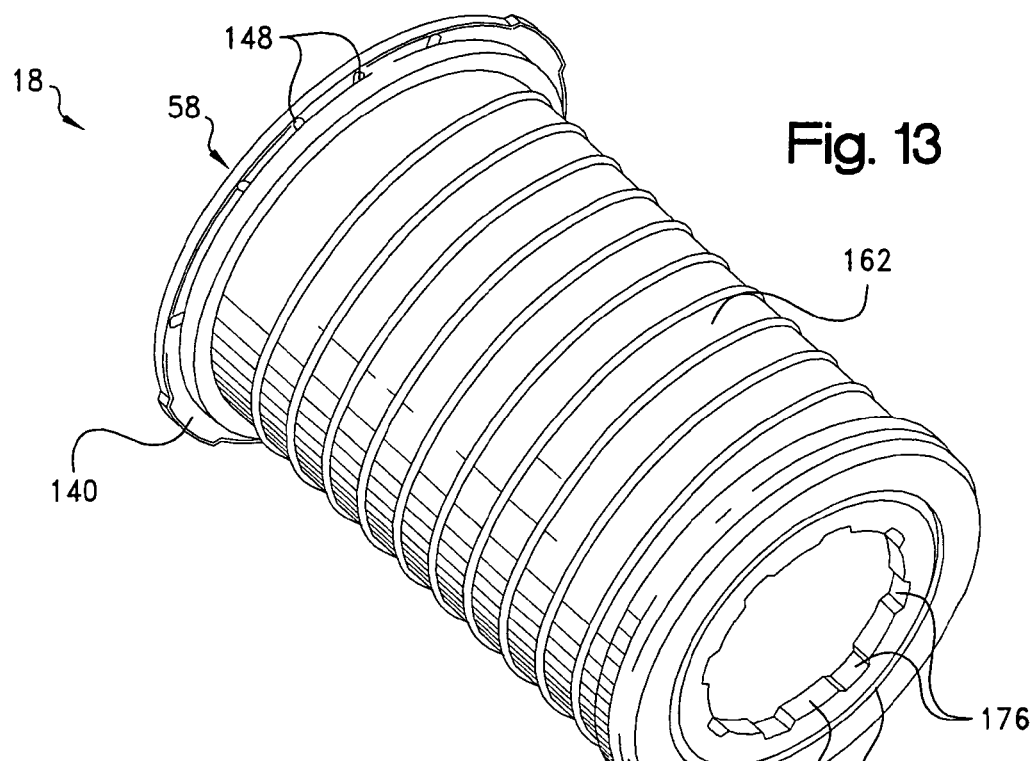
FIG. 13 is a perspective view of the primary filter pack assembly of the present invention.

Some of the pluralities of peripherally spaced retaining members 28, 30, preferably at least four equally spaced and adjoining members 28, 30, are further provided with two further parallel laterally-directed ribs or boss portions 54a, 54b, (FIGS. 2, 3) emanating from the twin ribs 52, the latter having an angular or peripheral extent 53 (FIG. 4) and transverse side surfaces 51 (FIGS. 2, 3). Twin ribs 52 form retainer members 28, 30, with boss portions 54a, 54b thereof, extending toward, but being spaced a predetermined distance from housing halves outer peripheral ends 46a, 46b, as best seen in FIGS. 2-6. The lateral outer ends of twin ribs 54a, 54b, are provided with aligned apertures 56 which, in turn, serve to retain the opposed pivot pin portions 64c of a latch 60 that preferably takes the form of a known or conventional over-center wire clip assembly best seen in FIGS. 7A and 7B. Handle segment 64 thereof comprises a single bent piece of steel wire, defining a handle section 64a, opposed central loops 64b and opposed pins 64c. Central loops 64b are oriented for the pivotal receipt of opposed hooked rear portions 66b of a latch segment 66, again comprising a single bent steel wire defining a latch section 66a, opposed hooked rear portions 66b and center, front hook or tip portion 66c. It should be understood at this time that latches 60 are preferably installed at eight locations, namely four at each outer end of the housing halved 26a, 26b and are adapted to securely attach outlet end 16 and primary filter pack assembly (FIGS. 13 and 14) or an end pan 58 (FIGS. 10-12). The operation of latches 60 will be described later.

Turning now again to FIGS. 5, 6, 8 and 9, both left and right housing ends 26a, 26b, at their outer peripheral ends 46a, 46b, respectively, are provided with a plurality of about 1 inch long (laterally) by about 0.250 inch wide (peripherally) by about 0.125 inch deep (radially) transverse female gear teeth 70, located in 10 degree increments about the entire periphery of each housing half end. It is important to understand that the location and positioning of gear teeth 70, at the outer ends of housing halves 26a, 26b, permits the rotation of filter housing assembly 14 for a distance 180 degrees longitudinally and permits the positioning of outlet end 16, as well as primary filter pack assembly 18, at either end of filter housing assembly 14. Thus, the 180 degree rotation of filter housing assembly 14 results in air inlet portion 40 appearing on the opposite side of vertical center and the opposite end of filter housing assembly 14.

Figure 15A:
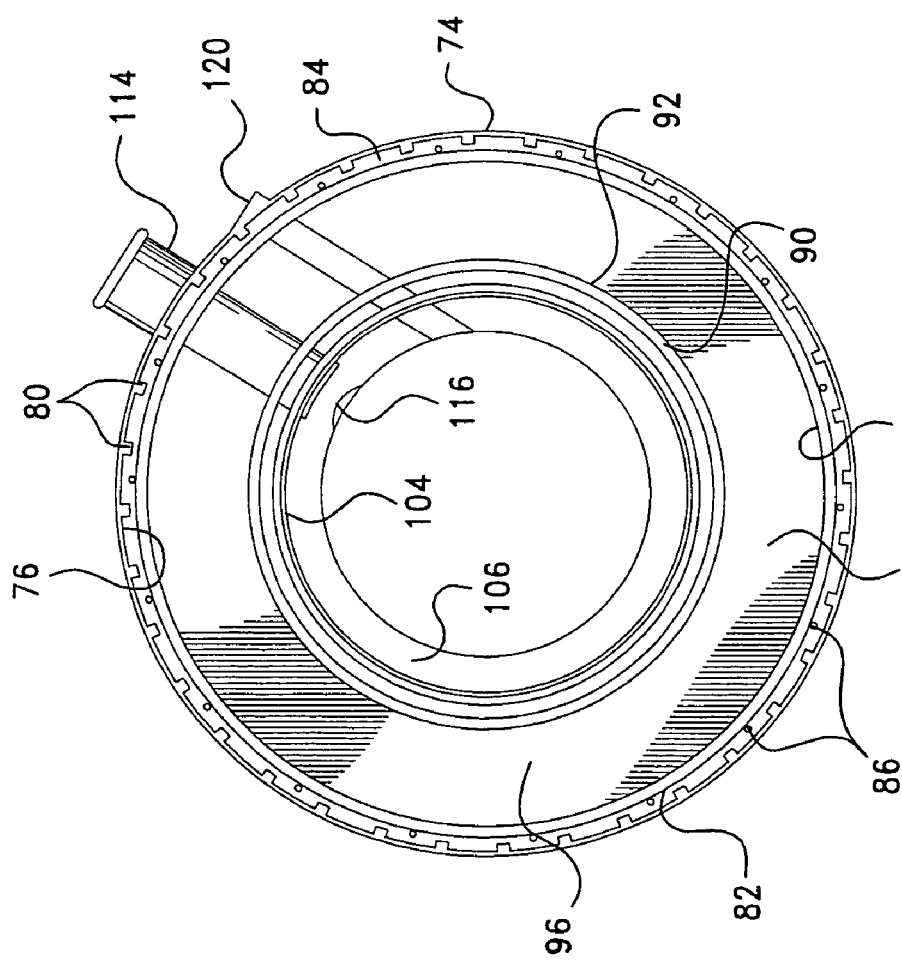
FIG. 15A is bottom view of the outlet end of FIG. 15.

Returning now to FIG. 1 and continuing with FIGS. 15-21, generally shown therein is outlet end 16, with FIG. 1 showing same in a perspective view. The top and bottom plan views of FIGS. 15 and 15A, respectively, show a rigid outlet end 16, which may be constructed of injection molded, preferably of a glass filled nylon 6 type of material, of a generally annular shape and having a maximum outside diameter portion 74 slightly larger than that of peripheral end portion 46b of right filter housing half 26b with which it is adapted to mate. Specifically, the inner peripheral surface 76 (FIG. 15A) of maximum diameter portion 74 is provided with a plurality of about 0.875 inch long (laterally) by about 0.1875 inch wide (peripherally) by about 0.120 deep (radially) transverse male gear teeth 80, located in 10 degree increments or intervals about the entire inner peripheral surface 76. Male gear teeth 80 are adapted to operatively mate with female gear teeth 70 on filter housing half 26b, thus allowing the positioning of outlet end 16, relative to filter housing air inlet portion 40 (FIGS. 3, 4), in 10 degree increments through 360 degrees.

Figure 14:
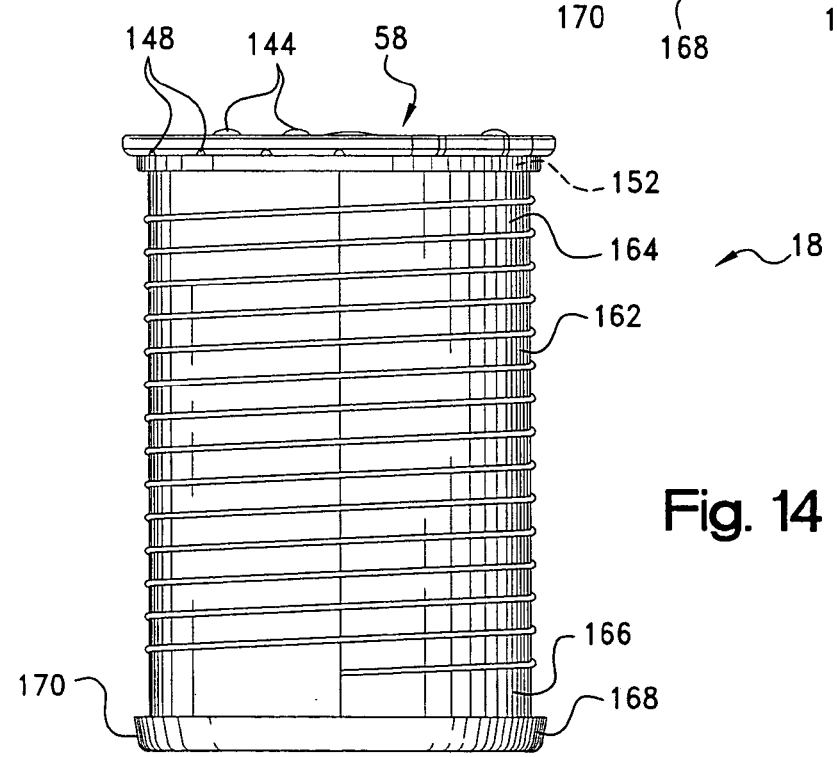
FIG. 14 is a side view of FIG. 13.
Figure 16:
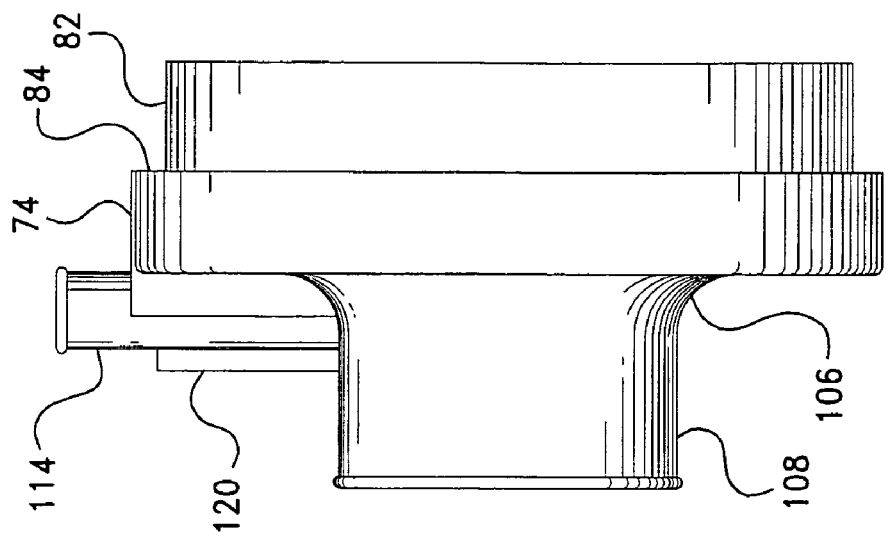
FIG. 16 is an edge or side view of the outlet end of FIG. 15.
Figure 15:
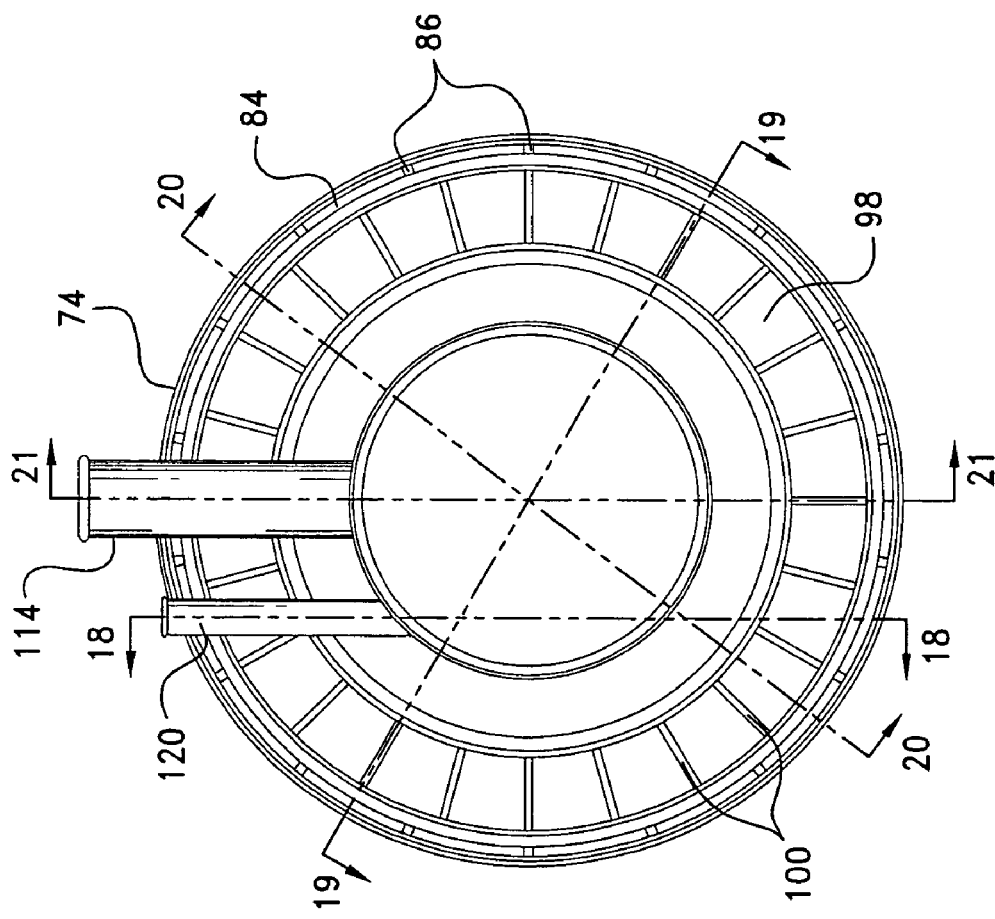
FIG. 15 is a top plan view of the outlet end of the present invention.
Figure 18:
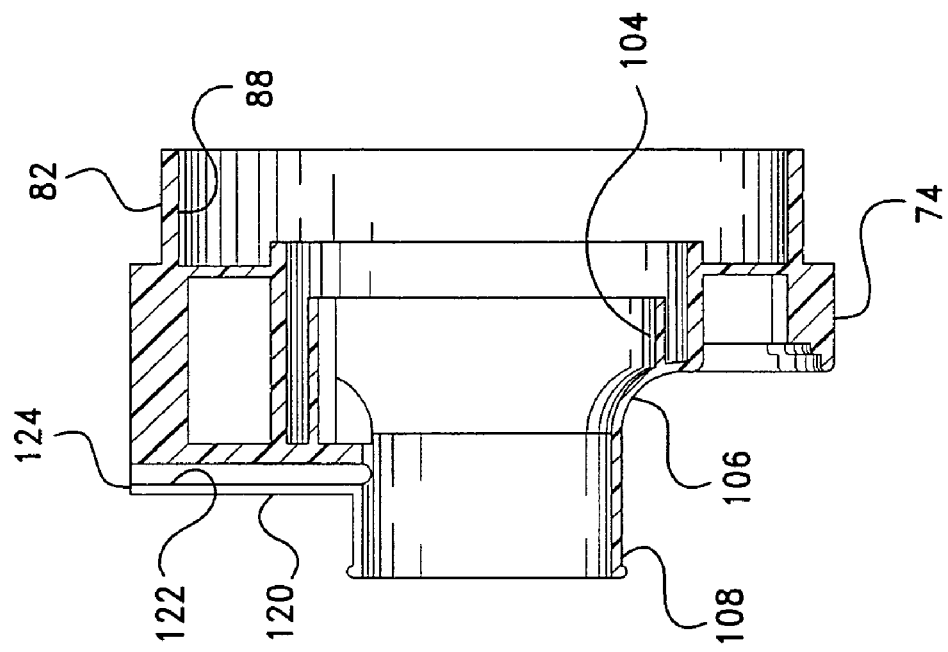
FIG. 18 is a transverse sectional view, taken along line 18-18 of FIG. 15.
Figure 17:
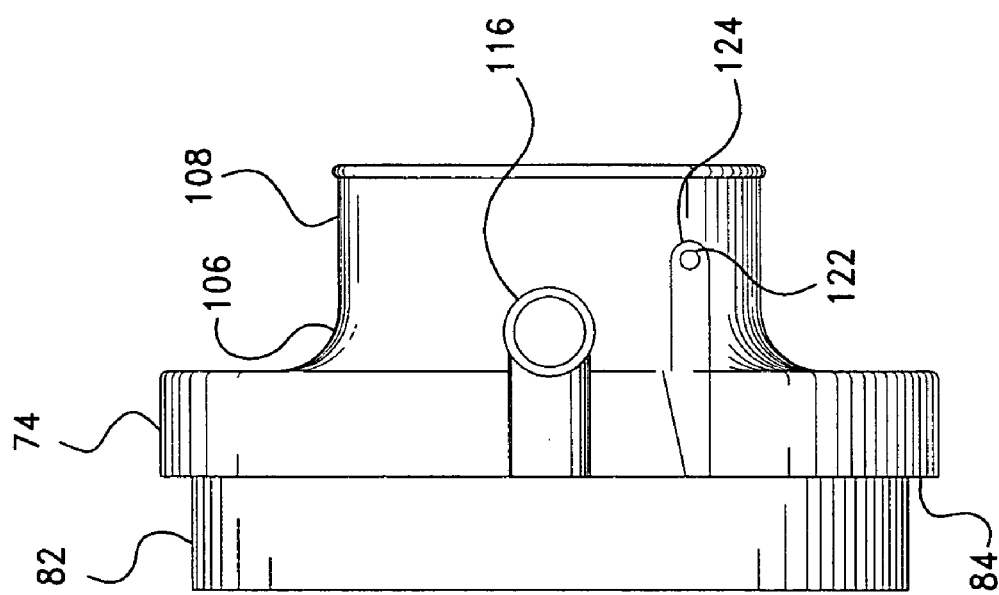
FIG. 17 is an edge view, similar to that of FIG. 16, but rotated 90 degrees.
Figure 21:
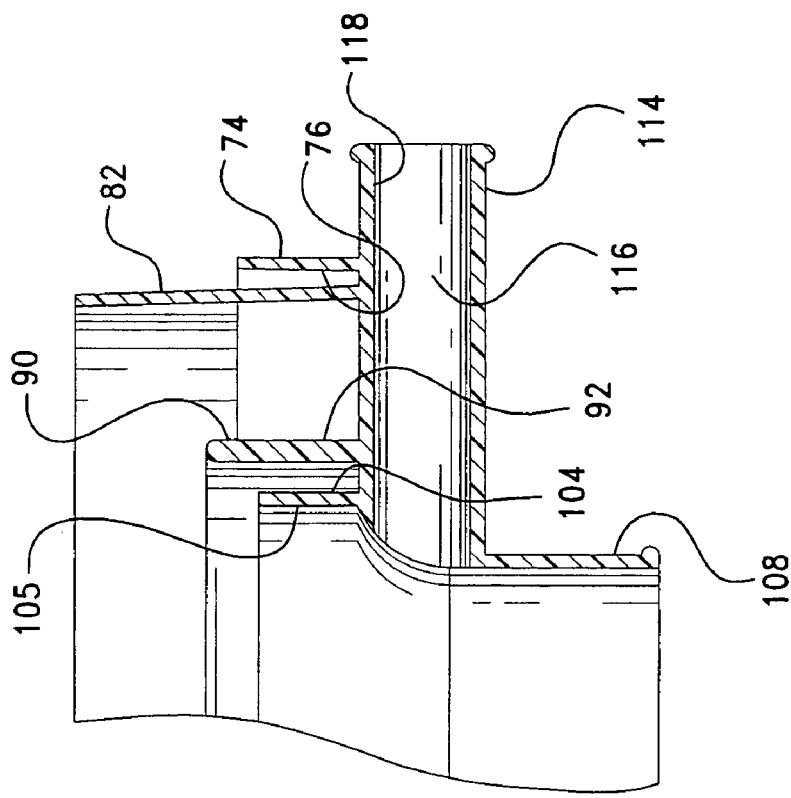
FIG. 21 is a further partial transverse sectional view, taken along line 21-21 of FIG. 15.
Figure 20:
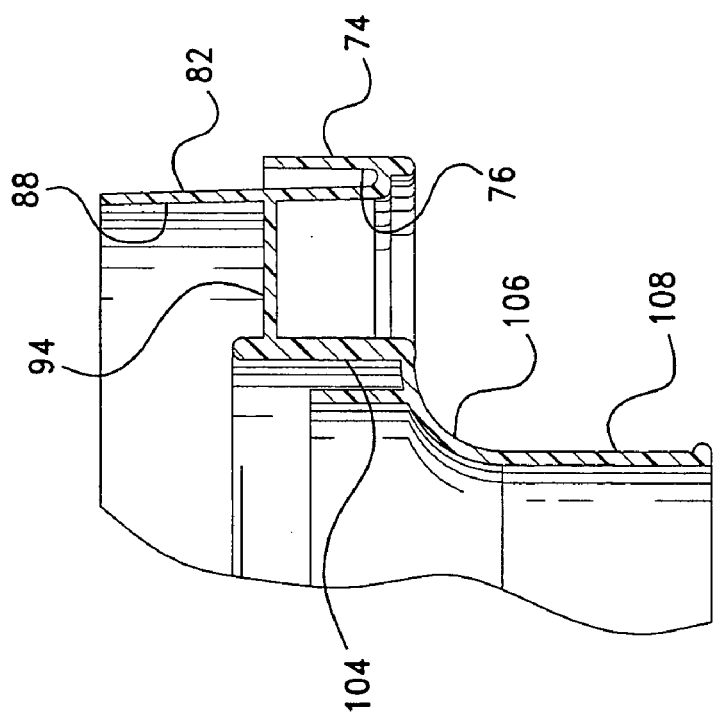
FIG. 20 is a partial sectional view, taken along line 20-20 of FIG. 15.
Figure 22:
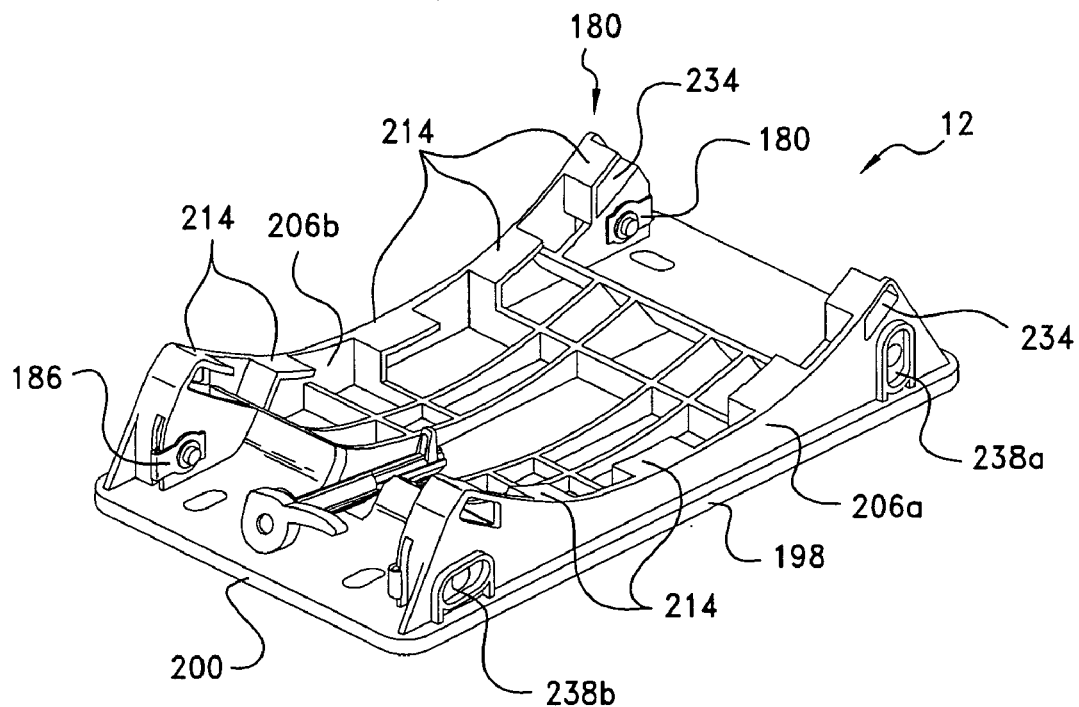
FIG. 22 is a perspective view of a mounting base assembly of the air filtration system of the present invention.
Figure 23:
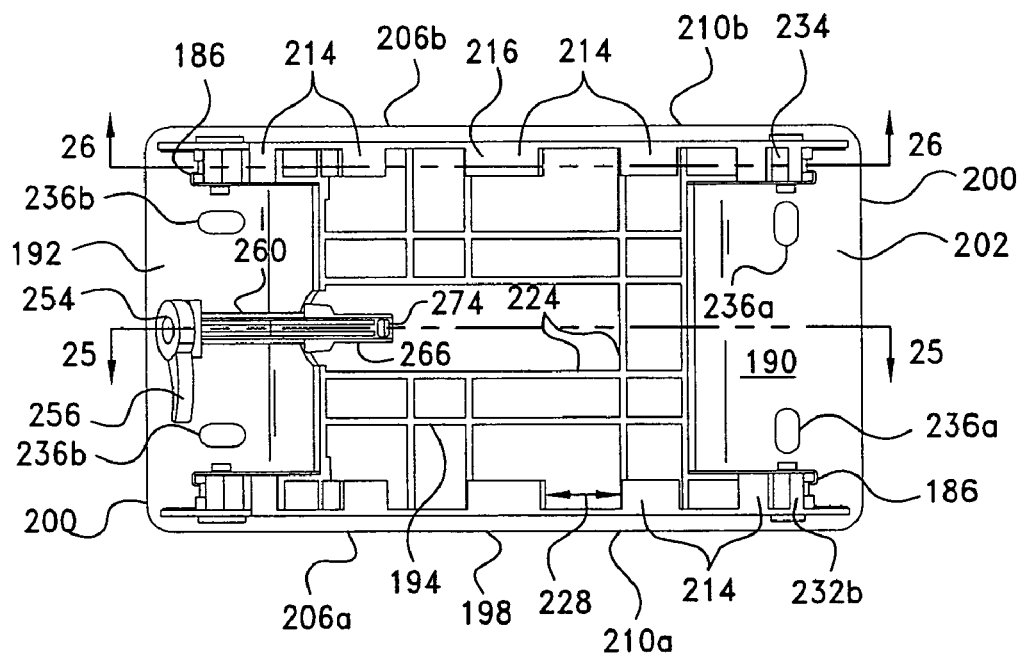
FIG. 23 is a top plan view of the mounting base assembly of FIG. 22.
Figure 24:
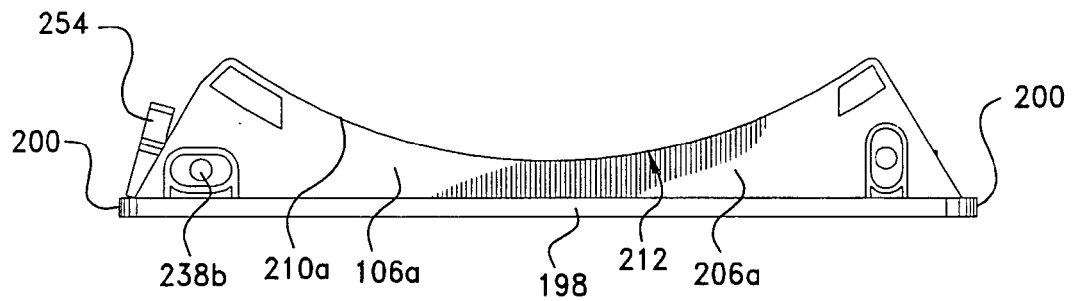
FIG. 24 is a front side view of the mounting base assembly of FIG. 23.

A further outside diameter portion 82, of a slightly smaller diameter than that of peripheral end portion 46b, of right housing half 26b, is coaxial with maximum outside diameter portion 74 and fits in a slip-fit manner within noted end portion 46b. Diameter portions 74 and 82 are joined via an annular outer end wall 84, which in turn is provided with a plurality of lateral drain holes 86 (FIG. 15), preferably peripherally spaced every 20 degrees about end wall 84 to allow any trapped water to exit when the engine is not operating. In addition, drain holes 86 are located laterally outboard of a radial seal outer surface 88, namely the inner peripheral surface of diameter portion 82. A radial seal inner surface 92, which is also the outer peripheral surface of yet a smaller annular diameter portion 90, coaxial with diameter portions 74 and 82, serves to provide an added safety seal surface, at outlet end 16, for the urethane outlet end 166 of filter pack 162 as best seen in FIG. 14. Diameter portions 82 and 90 are joined via an annular connecting wall 94 whose inner surface 96 merges into sealing surfaces 88 and 92, respectively. The axial outer surface 98, of connecting wall 94, is provided with a plurality of preferably equally peripherally spaced rib portions 100 that join or connect diameter portion 82 with diameter portion 74. Finally, as shown in FIGS. 18, 20 and 21, an innermost annular diameter portion or ring 104 provides an outer locating surface 105 for safety filter assembly 20, in a manner to be discussed later.

Innermost ring 104 merges, via a smooth, tapered transition surface 106, into an axially extending, generally cylindrical outlet portion 108 having a predetermined diameter slightly smaller than that of filter housing air inlet portion 40. Transition surface 106 provides a smooth, curved transition for the filtered air stream as it exits from the media of filter assemblies 18, 20 and enters into ducting (not shown) leading into the engine.

Outlet end 16 further includes a molded-in first boss 114 that extends radially from transition surface 106 outwardly slightly beyond diameter portion 74. Boss 114 is provided with a through bore or aperture 116 having threaded outer end portion 118. A second boss 120, substantially parallel with boss 114, also extends from transition surface 106 to about diameter portion 74 and also includes a through bore or aperture 122 having a threaded outlet portion 124. Boss portions 114, 120 are utilized for CCV (crankcase ventilation) and filter restriction indicators (not shown). Threaded end portions 118, 124 permit installation of these devices at outlet housing or end 16 or remotely therefrom, as desired. It should be understood that the CCV and filter restriction indicator ports, at 118 and 124, may be positioned in 10 degree increments, relative to air inlet portion 40, through 360 degrees via the rotation of outlet 16 relative to filter hosing assembly 14. Once the desired rotational alignment has been achieved, as best seen in FIGS. 2-4, outlet end 16 is attached to filter housing outlet end 46b (FIGS. 5B, 6B) via a plurality, such as four, over-center wire clip assemblies 60 whose front hook positions 66c are adapted to operatively engage with outlet housing maximum outside diameter portion 74. The use of wire clip assemblies 60 will permit subsequent rotational alignment if desired, but if this is not deemed necessary then, as an alternative to the use of clip assemblies 60, outlet end 16 may be heat staked in the desired set position.

Going back to FIGS. 10-12, illustrated therein is an end cap or end pan 58 that is basically disc-shaped and is preferably constructed of a glass filled nylon 6 type of material. End cap 58 includes, on its inner end surface 128, a first or outer annular, perpendicular, lip 130 having a predetermined outer diameter and an axial extent sufficient to permit a slip fit insertion into outer peripheral end 46a of housing assembly left half 26a. A second or inner, annular, perpendicular lip 134, extending from surface 128 and concentric with first lip 130, serves to define an annular recessed portion or groove 132 therebetween that is adapted to confine an annular end surface of a known, generally cylindrical, primary filter pack 162 (FIG. 14) having a wall thickness commensurate with the axial width of groove 132. The maximum diameter portion 136 of end cap 58 is slightly greater than that of outer lip 130, thus producing a peripheral ring portion 138 that abuts housing assembly left half peripheral end 46a upon the insertion of end cap 58 thereinto. Extending generally radially inwardly to a central domed area 135, from ring portion 138, are three equally spaced, spiraling rib portions or arms 137 that are generally inwardly C-shaped, in cross section, as best seen in FIG. 11. Ring portion 138, in addition to a raised ring portion 139, includes opposed radially flared portions 140 that function as convenient operator handles for installation and removal purposes. Rim portion 138 further includes a plurality of circumferentially spaced, recessed, radially directed slots 148, having widths of about 0.250 inches, that allow any water trapped in the air filter assembly to drain out when the engine is not operating. Extending axially outwardly from an axial outer end surface of end cap 58 are three preferably equally circumferentially spaced protrusions 144, each also having a generally hexagonal, angled undercut 146, relative to inner surface 128, whose function will be described later.

Figure 11A:
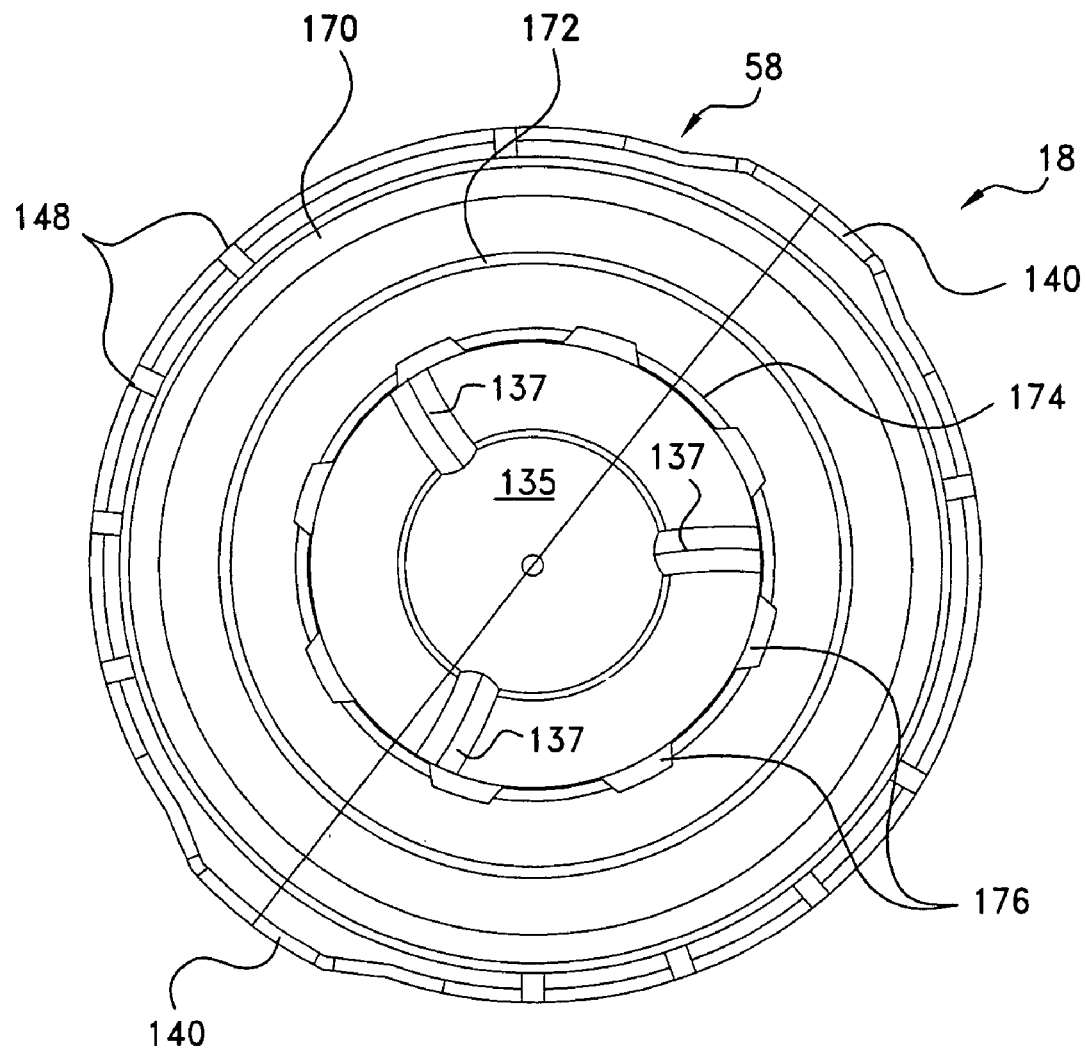
FIG. 11A is a view, similar to that of FIG. 11, with the addition of the integral primary filter pack of the present invention.

Turning now to FIG. 11A, illustrated therein is a plan view, similar to that of FIG. 11, wherein the inner end surface 128 (FIG. 11) of end cap or end pan or filter access cover 58 is fixedly attached to one end of a known, proven, generally cylindrical, primary filter pack 162, such as, for example, a filter medium of pleated, water-resistant high efficiency paper. In the FIG. 14 structure, the axial outer or cap end 164 of filter pack 162 is both sealed and adhered to end cap inner surface 128 via a known adhesive type of urethane material 152 (not shown per se), such as, for example, BASF Elastofoam 37060 made by the BASF Corporation of Wyandotte, Mich., U.S.A. having a free rise density of about 30-40 lb/cu.ft. and a Shore "A" hardness of about 60 minimum. The axial inner or outlet end 166 of filter pack 162 is sealed with a known foaming type urethane material 168, such as, for example, BASF Elastofoam 37070 having a free rise density of about 22-25 lb/cu.ft. and a Shore "A" hardness of about 50. Foaming type urethane material 168 also acts as both an inboard radial safety seal 172 and an external radial seal 170 relative to outlet end 16. The functions of external urethane seal 170 and the inboard safety seal 172 are to make as certain as possible that primary filter pack assembly 18, will not leak in any condition, short of a catastrophic failure caused by misuse. The design of the noted double sealing ability is such that should one of the two seals 170, 172, fail for some reason, the remaining seal is capable of fully sealing primary filter pack 162 at the outlet end 16. When primary filter pack assembly 18 is used in conjunction with safety filter assembly 20, to be described later, it essentially results in a "goof" proof system, for at least the short term. The unique lug-nut shaped, angled undercuts 146, in end cap 58, also allow a mechanical attachment of filter medium 162 to end cap 58 by permitting flow of the adhesive type of urethane attaching material 152 thereinto, thus adding mechanical or structural locking therebetween, in addition to the chemical adhesive attachment or adherence of this urethane material. The previously noted C-shaped cross section of spiraling ribs or arms 137 also permits the adhesive type urethane material 152 to flow thereinto, thus providing additional resistance against undesired radial twisting or turning of primary filter pack 162, relative to end pan 58. The fixed coupling of end cap 58 to filter pack 162 not only minimizes the number of individual components but also permits easier installation and replacement thereof. Inner or outlet end 166 is also provided, at its inner annular surface 174 with a plurality of individual, equally spaced, scalloped portions 176 that serve to locate filter pack 162 in the mold that is utilized in adding foaming type urethane material 168. End cap 58, together with its integral filter pack 162, which together comprise primary filter pack assembly 18, is adapted to have filter pack 162 inserted into filter housing outer end portion 46a (FIGS. 5A, 6A) and thereafter end cap 58 is attached via a plurality, such as four, over-center wire clip assemblies 60, whose front hook portions 66c operatively engage with cap end raised ring portion 139. While filter pack assembly 18 is basically cylindrical in shape, rotational alignment is not a problem but end cap 58 should preferably be so rotationally aligned with filter housing outer end portion 46a that wire clip hook portions do not engage with end cap flared portions 140 that function as operator handles.

Figure 29:
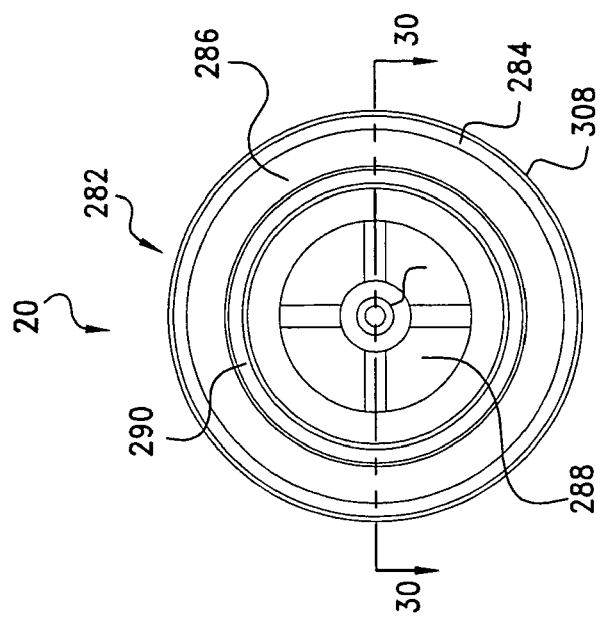
FIG. 29 is a bottom view of FIG. 28.
Figure 28:
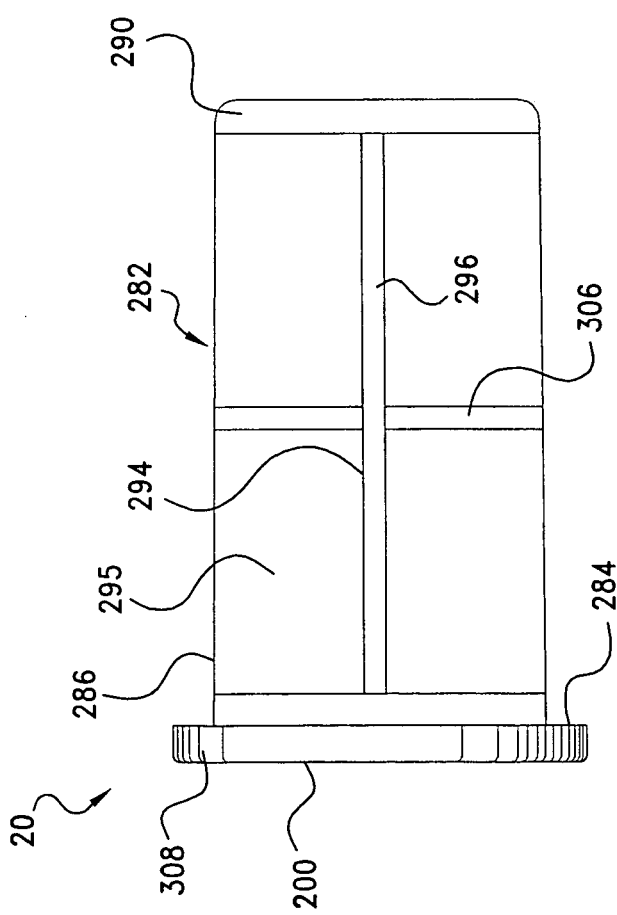
FIG. 28 is side view of the safety filter assembly of the present invention.

Turning now to FIGS. 28-30, illustrated therein are end, bottom and sectional views, respectively of a safety filter assembly 20, that is generally comprised of a truncated cone-shaped main body 282, annular base 284 at a lower end 286 of body 282, and an inverted, generally conical recessed portion 288 that is joined with body 282 via a radiused generally U-shaped joinder portion 290 which in turn terminates at its inner end in a circular area or end surface 292. Safety filter assembly 20 utilizes a lattice type frame or rib structure 294 (FIG. 31) which includes base 284, joinder portion 290 and circular end surface 292. Frame 294, in turn, includes a plurality of preferably circumferentially spaced axial lattice portions, or bands 296 that serve to connect base 284 and joinder portion 290, with further lattice portions or bands 298 (FIG. 32) connecting joinder portion 290 and its end surface 292. Circumferential lattice portion or band 300, at base 284 and band 302, intermediate base 284 and joinder portion 290, serve to join or connect axial lattice bands 296.

Safety filter frame 294 may be constructed of an injection molded structural reinforcing material, preferably of a glass filled nylon 6 type, material, with frame 294 being typically over molded onto a needlepunched felt medium having a Frazier air permeability of about 300 CFM per square foot at 0.5 inches of water. One example of such a felt medium is a 15.0-denier polyester material, indicated at 295 in the drawings, about 0.080 inches in thickness, for example, which has previously been flame singed and resin treated for stability. A vertical portion 306 of base 284 is surrounded by a circumferential sealing ring 308 that is also comprised of the just described polyester felt medium 295. The preferred fabrication or manufacturing process for safety filter assembly is as follows: a. the needlepunched polyester felt medium 295, for conical recessed portion 288, is die cut and formed into a cone shape which is then heat sealed along the outside edge; b. the heat sealed cone is then placed on the core side of a first injection mold; c. the first mold is closed and clamps the needle punched material in place; d. glass filled nylon 6 type material is injected into the first mold cavity, thereby encapsulating the felt medium and forming the open, lattice type frame portions around this material; e. the now finished conical part 288 is then placed into a second injection mold, in an inverted position similar to that shown in FIG. 30; f. a previously die cut, truncated cone shaped and heat sealed similar felt medium 295, for main body 282, is then also placed into the second mold, together with a flat circular disc shaped part of polyester material 295 that will be formed into base 282 and sealing ring 308; g. the second mold is closed and clamps the several parts in their proper place, and; h. glass filled nylon 6 type material is then injected into the second mold cavity, thereby encapsulating and thus uniting the noted polyester felt medium parts by forming the open, lattice type frame 294 around conical recessed portion 288, truncated cone shaped main body 282, and base 284, including top end surface 292, joinder area 290, base 284, as well as at all of rib portions 296, 298, 300 and 306. The resulting safety filter assembly 20 thus becomes, structurally, a one piece part.

Figure 19:
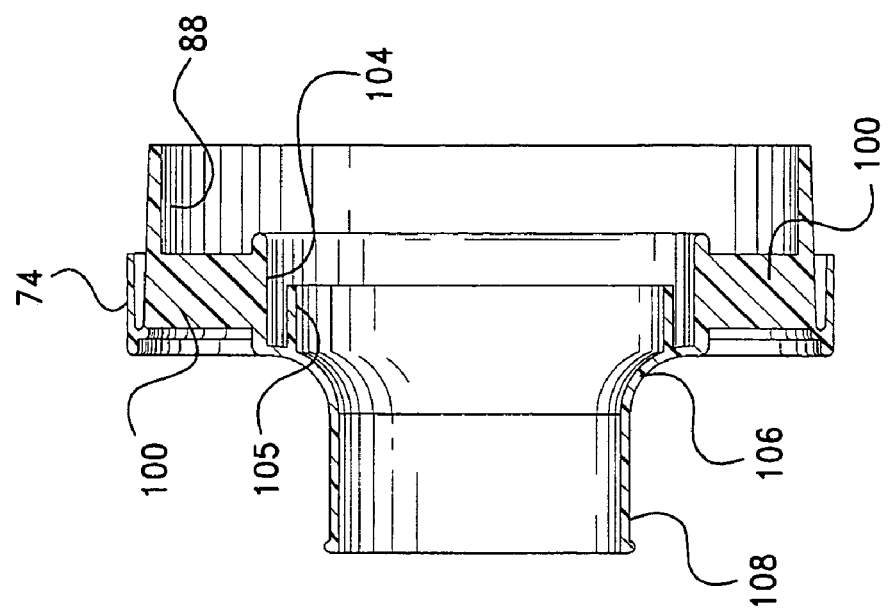
FIG. 19 is another transverse sectional view, taken along line 19-19 of FIG. 15.

Safety filter assembly 20 is adapted to be inserted into outlet end 16, specifically at inner surface 105 of ring portion 104 thereof, as best seen in FIGS. 19-21, and is held in place by the inner cylindrical surface 174 (FIG. 13) of primary filter pack 162 into which it axially extends, as best illustrated in FIG. 1. While the main function of safety filter assembly 20 is to prevent undesired foreign material from entering outlet end 16, during the replacement of primary filter pack assembly 18, safety filter assembly 20 will, in addition, provide limited air filtration, for a short period of time, in case of a catastrophic failure of primary filter pack assembly 18.

Turning now back to FIGS. 22-27, illustrated therein are a perspective, top, side, end and sectional views, respectively of filter attachment base assembly or mounting base assembly 12, for the air filtration assembly 24, wherein base assembly 12 is basically comprised of a base frame 180, locking mechanism 240 and four metallic "U" type nuts 186. All but nuts 186 and a retention screw in locking mechanism 240 may be constructed via injection molding of preferably glass filled nylon 6 type of material. Base frame 180 includes a substantially flat bottomed base plate 190 having a generally rectangular first, trailing or locking end portion 192, spaced from a second, leading or plain end portion 196 via a central connecting portion 194. Portions 192, 194 and 196 share opposed, longitudinally extending, flat base ribs 198 that merge into opposing, transversely extending, end ribs 200 so as to produce a flat base plate 202.

Figure 25:
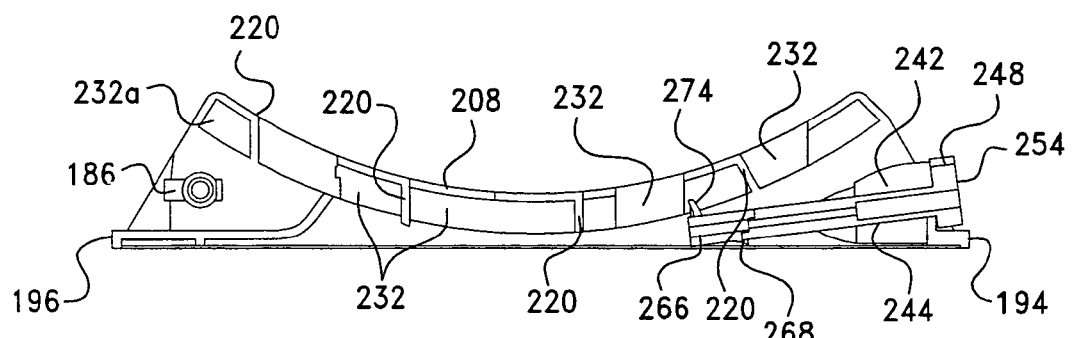
FIG. 25 is a simplified, lateral, sectional view, taken along line 25-25 of FIG. 23.
Figure 26:
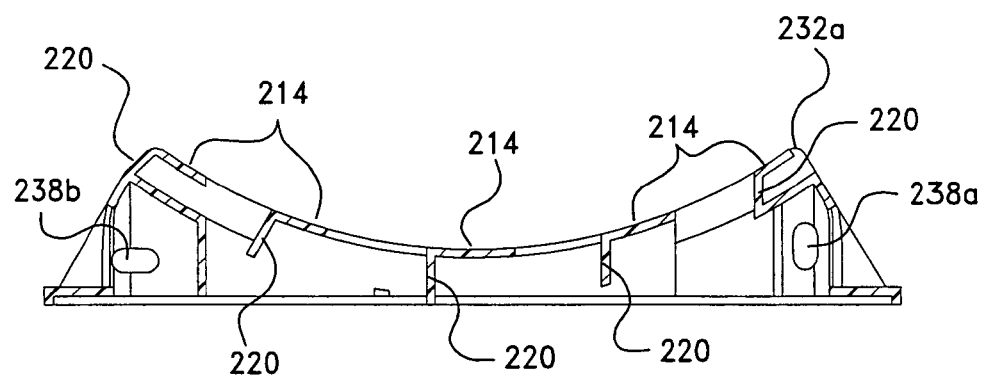
FIG. 26 is another simplified, lateral, sectional view, taken along line 26-26 of FIG. 23.
Figure 27:
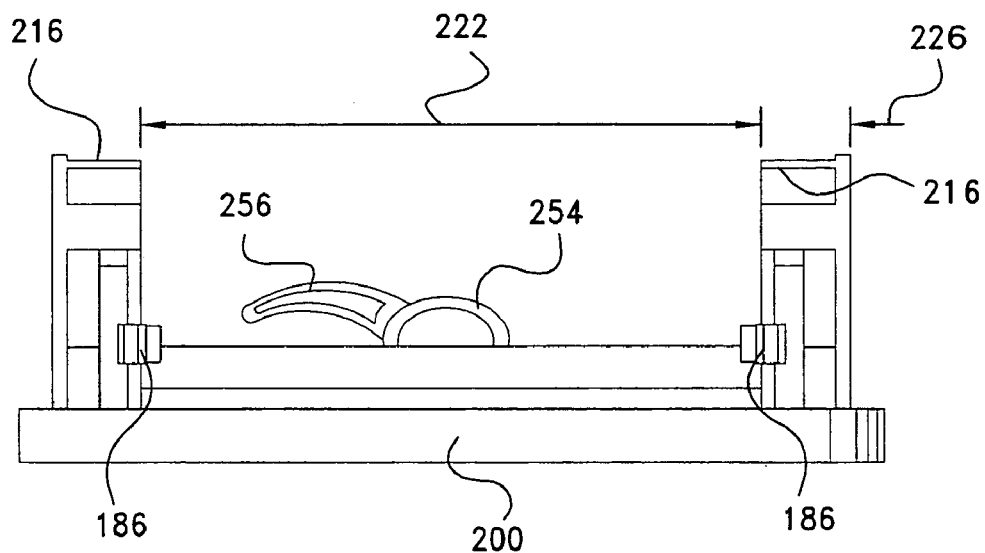
FIG. 27 is a right end view of FIG. 24.

Parallel with longitudinal base ribs 198, and extending perpendicularly from base plate 202, are opposed, spaced, side plates 206a, 206b, defining on their upper surface, a common radially curved, or contoured discontinuous, horizontal plane or short arcuate bed portion 208 that includes continuous outer walls 210a, 210b, with bed portion 208 having a radius of curvature 212 that is slightly greater than the radius of filter housing assembly 14 at recess portions 48 of T-shaped appendages 50 as best seen in FIGS. 2-4. Transversely oppositely extending from outer walls 210a, 210b, are pluralities, such as five, spaced, generally rectangular support pads 214, whose upper surfaces 216 have substantially the same radius of curvature 212 as outer walls 210a, 210b. The multiple spacings, such as the five slots or slots 228 (FIG. 23), formed between adjacent ones of support pads 214, are slightly smaller, in their angular extent, than the angular extent 53 (FIG. 4) of each T-shaped appendage 50. The lateral space 222 between the inner opposite ends 218 of support pads 214, best seen in FIG. 27, is slightly greater than the lateral space between the inner ends of the recess portions 48 of opposed T-shaped appendages 50 of filter housing assembly 24, as best seen in FIGS. 2, 3. Similarly, the transverse extent 226 of support pad upper surface 216 is about the same as the depth or transverse extent of appendage recess portions 48. The front or leading edges of spaced support pads 214 merge into generally vertically disposed stop portions 220 whose distal ends, in turn, merge into a support structure that includes central connecting portion 214 which is comprised of a plurality of transverse and longitudinal support ribs and surfaces, the upper surfaces of which are also radially curved so as to define a further discontinuous plane or short arcuate bed portion 230 (FIG. 25) having a radius of curvature that is slightly greater than the radius of filter housing assembly 14 at a radial outer surface of T-shaped appendages 50. It should be understood that planes 208 and 230 are parallel but radially spaced from each other, thus defining therebetween, opposed, spaced, curved slot portions 232 (FIG. 25), with the angular extent of each slot portion 232 being limited by stop portions 220, as best seen in FIGS. 25, 26. Each leading slot portions 232a, 232b, at base plate leading portion 196, at the end opposite of stop portion 220, has an open end 234, the purpose of which will be explained later.

Base plate 190, at leading end 196 is provided with opposed, laterally directed, elongated slots 236a in flat base plate 202 and oppose, vertically directed, elongated slots 238a, in side plates 206a, 206b, while trailing end 192 is provide with similar but axially directed such slots 236b and horizontally directed such slots 238b. Slots 236a, 236b, serves as vertical mounting holes for base assembly 12 near its area of utilization, while slots 238a, 238b, in conjunction with U-shaped nuts 186 that are snapped in place and approximately centered relative to these slots, serve as horizontal mounting holes and built-in retainers for base assembly mounting as noted.

Figure 27A:
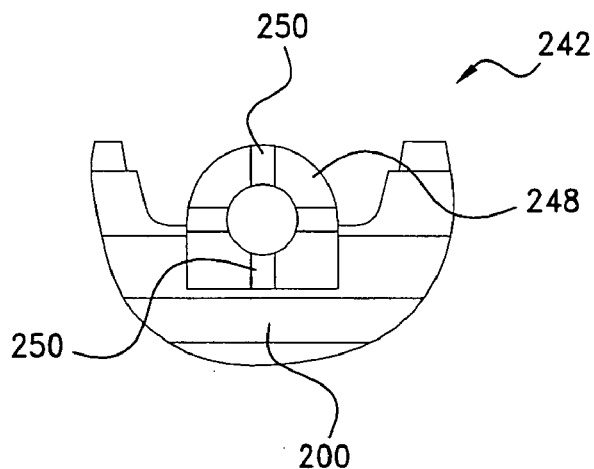
FIG. 27A is an enlarged, partial end view of a lock lever assembly housing of the mounting base assembly.
Figure 27B:
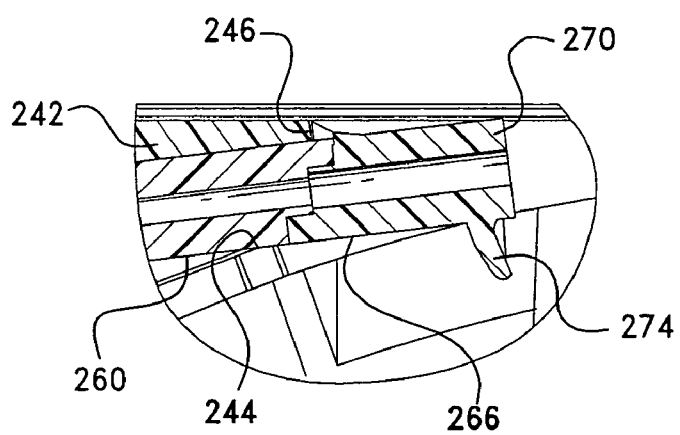
FIG. 27B is an enlarged showing of the sectioned portion of the locking mechanism of FIG. 25.
Figure 27D:
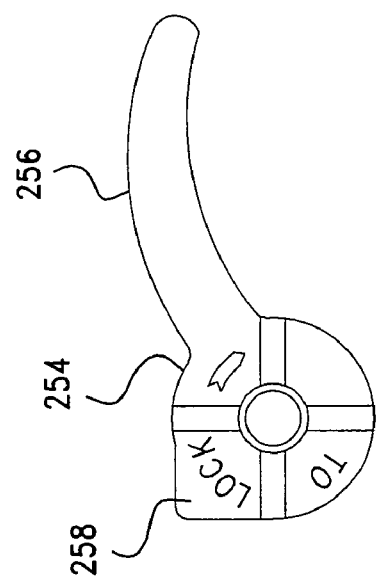
FIG. 27D is a top plan view of the lock lever of FIG. 27C.
Figure 27C:
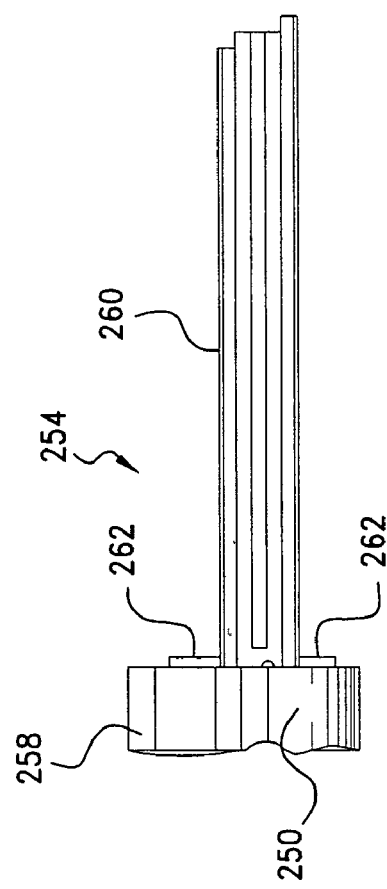
FIG. 27C is a top plan view of the lock lever of this invention.

Trailing base plate portion 192, laterally between side plates 206a, 206b, is provided with a locking mechanism 240 that includes an axially extending boss portion or lock lever housing 242 having a central axial through bore 244, an inboard end face 246 (FIG. 27B) and an outboard end face 248 (FIG. 25), the latter having at least two detent recesses or indentations 250 best seen in FIG. 27A. Boss portion 242 is adapted for the receiving and retention of a lock lever 254 having an outer, laterally directed handle portion 256 and an axially directed apertured first shaft portion 260, the latter including at least two raised detent portions 262 (FIG. 27C), complementary with detent recesses 250 (FIG. 27A), at the shaft/handle interface designed to matingly engage with detent recesses 250 in locked and unlocked positions of lock lever 254. After the full insertion of first shaft portion 260 into bore 244, an apertured second shaft portion 266 is attached to first shaft portion 260 at boss inboard end face 246, with adjoining second shaft portion 266 including a proximate semi-flexible half moon shaped, semi cylindrical protrusion or tension member 268 (FIGS. 27E, 27F, 27G) which is biased and acts against end face 246 to maintain tension against housing indentations 250 thereby preventing lock lever 254 from unintentionally rotating out of the locked or unlocked position as will be explained later. The distal end 270 of second shaft portion 266 is provided with radially extending lock pin 274, extending at an angle of about 90 degrees relative to the angular extent of lock lever 254, with the function of lock pin 274 to be detailed later. It should be understood at this time however that when locking pin 274 is rotated into its engaged position, it physically extends into and through base plate plane 230 into the space between plane 230 and base plate plane 208. First and second shaft portions 260, 266, respectively are aligned and fixedly coupled via a suitable retention screw (not shown), such as via a conventional tri-lobular screw for plastic materials which also aids in maintaining the previously noted tension to prevent unwanted lock lever rotation.

In terms of the attachment of air filter assembly 24 to filter base assembly 12, let there be the initial assumption that the latter has initially already been secured to a structure adjacent to its place of utilization, via a plurality of attachment members (not shown) extending through base assembly retaining slots 236a, 236b and/or 238a, 238b, and that lock pin 274 of locking mechanism 240 is rotated so that it does not extend into base plate plane 230. Thereafter, as best shown in FIG. 1, air filtration assembly 24 is positioned, and as further illustrated in FIGS. 3 and 4, so that five adjacent ones of housing T-shaped appendages 50 line up with line up with corresponding ones of the five base plate slots 228 (FIGS. 2, 3) and then rotating air filtration assembly 24 counter-clockwise so that support pads 214, enter recess portions 48, in T-shaped appendages 50 and continuing this rotation until stop portions 220, of support pads 214, abut adjoining transverse sides of T-shaped appendages 50. Thereafter, rotating locking lever handle 256 clockwise, will rotate lock pin 274 into a perpendicular locking engagement with an opposite side of one T-shaped appendage 50 (FIGS. 2, 3) thereby completing the locking attachment of air filter base assembly 24 to filter attachment base assembly 12. Locking lever 254 is prevented from rotating counter clockwise more than 98 degrees by a built-in stop portion 258 (FIG. 27D) protruding from locking lever 254 which strikes base plate lock end surface 192, upon the rotation thereof, in one direction, thereby preventing further rotation of locking lever 254.

It is deemed that one of ordinary skill in the art will readily recognize that the present invention fill a number of remaining needs in this art and will be able to affect various changes, substitutions of equivalents and various other aspects of the invention as described herein. Thus, it is intended that the protection granted hereon be limited only by the scope of the appended claims and their equivalents.

What is claimed is:

1. An air filter assembly system comprising in combination:
    a. a housing split into abutting, generally cylindrical, housing halves, adapted to be joined at mating peripheral inner ends via a plurality of substantially equally peripherally spaced, opposed, abutting retaining members having opposing lateral recess portions defining T-shaped appendages;
    b. a cylindrical air inlet, on said housing, formed of transversely directed, abutting, semi-cylindrical air inlet portions, perpendicular to said housing, emanating from opposed curved portions of said housing halves inner ends, said cylindrical air inlet being substantially tangential with the peripheral curvature of said housing;
    c. a primary filter pack assembly including a basically disc-shaped, rigid, end cap having a diameter, greater than those of housing halves outer ends, and an inwardly depending, perpendicular, peripheral, outer lip of a diameter and axial extent so as to permit a slip-fit insertion of said cap into one of said housing halves outer ends, said end cap also including an inwardly depending, perpendicular, peripheral, inner lip, said lips defining, therebetween, an inner groove adapted to receive as well as fixedly confine and seal, via the addition of an adhesive material, an outer annular end portion of a generally cylindrical primary filter pack, with an inner annular end portion thereof being provided with a sealing material that serves the functions of both an inboard radial seal and an outboard radial seal, relative to a filter outlet end, said primary filter pack assembly, via its attached end cap, being adapted to be removably secured to said one of said housing halves, with said primary filter pack extending into said housing, via a plurality of peripherally spaced first latches attached to said one of said housing halves;

d. said filter outlet end being generally annular in shape and having a plurality of coaxial, longitudinally extending annular rib portions, with an outermost diameter rib portion thereof having an inner surface of a diameter and axial extent so as to permit a slip-fit over one of said housing halves outer ends, said plurality of annular rib portions including a radially innermost annular air outlet portion connected to a first radially larger diameter annular rib portion via an annular connecting wall, and second and third successively larger diameter, spaced annular rib portions, with adjacent ones of said outermost, first, second and third rib portions being connected via annular end walls, said outlet end being adapted to be secured to one of said housing halves via one of heating staking and a plurality of peripherally spaced second latches attached to another one of said housing halves and;

e. a safety filter assembly having a generally truncated cone-shaped body with an annular base at one end and an inverted, generally conical, inwardly directed, recessed portion attached to another end of said body, said safety filter assembly being adapted to be inserted into said filter outlet end, with said safety filter annular base being sealingly received within said outlet end first radially larger diameter annular rib portion and said safety filter assembly extending into said housing and therein, being held in place by and within said primary filter pack; and f. a filter attachment base assembly including a base frame with perpendicularly spaced side plates having, on their upper surfaces, a radially curved first bed portion, having a first radius of curvature, said first bed portion including a plurality of similarly curved, lateral, support pads, with integrated vertical stop portions, said support pads being separated via intermediate spacings, said base frame including a radially curved second bed portion having a second radius of curvature slightly greater than that of said first bed portion, said first and second bed portions, together with said spaced support pads and stop portions, defining, therebetween, a plurality of spaced, curved slot portions, said filter attachment base assembly further including a locking mechanism having a lock pin rotatable into the space between said first and second bed portions, said housing being adapted to be joined to said filter attachment base assembly by positioning said housing so that a plurality of said T-shaped appendages, after being lined up with successive ones of the intermediate spacings between said first bed support pads, enter said curved slot portions, with rotation of said housing causing said support pads to enter said opposed recess portions of said T-shaped appendages and, continuing said rotation until said support pad stop portions abut one side of said appendages and, thereafter rotating said locking mechanism until said lock pin operatively engages another side of one of said appendages.

2. The air filter assembly system of claim 1, wherein said plurality of T-shaped appendages are formed on said housing halves mating peripheral inner ends at predetermined first angular increments.

3. The air filter assembly system of claim 2, wherein said first angular increments are about 20 degrees.

4. The air filter assembly system of claim 3, wherein said first angular increments have a peripheral extent of about 240 degrees, thus including a total of thirteen of said T-shaped appendages.

5. The air filter assembly system of claim 4, wherein, when said housing is secured to said filter attachment base assembly, said T-shaped appendages permit the angular adjustment of said housing, relative to said filter attachment base assembly, in 20 degree increments through about 200 degrees of rotation.

6. The air filter assembly system of claim 5, wherein, when said housing is locked in place, on said filter attachment base assembly, five of said T-shaped appendages are operatively engaged with said support pads of said filter attachment base assembly.

7. The air filter assembly system of claim 1, wherein each of said housing halves includes, at its peripheral outer end, a multiplicity of equally peripherally spaced, in predetermined second angular increments, female gear teeth.

8. The air filter assembly system of claim 7, wherein said second angular increments have an extent of about 10 degrees.

9. The air filter assembly system of claim 8, wherein said second angular increments extend about the total periphery of each of said housing outer ends.

10. The air filter assembly system of claim 1, wherein said housing halves are substantially allochiral.

11. The air filter assembly system of claim 1, wherein said cylindrical air inlet is located at the longitudinal center of said housing; is substantially tangent with the peripheral curvature of one side of said housing; and of a diameter smaller than that of said housing.

12. The air filter assembly system of claim 11, wherein incremental rotation of said housing, for 180 degrees longitudinally, successively places said air inlet on one of a first end, a first side, a second end and a second side, respectively, of a longitudinal center line of said housing.

13. The air filter assembly system of claim 11, wherein rotation of said housing 180 degrees longitudinally, places said air inlet on either end or either side of a longitudinal center line of said housing, as desired.

14. The air filter assembly system of claim 1, wherein each of said pluralities of peripherally spaced first and second latches, attached to said housing halves, takes the form of an over-center wire clip assembly.

15. The air filter assembly system of claim 1, wherein said base frame and said side plates, of said filter attachment base assembly, include a plurality of elongated slots, for mounting members, to permit ready mounting thereof to a support structure.

16. The air filter assembly system of claim 1, wherein said filter attachment base assembly includes six curved slot portions, thereby permitting the insertion thereinto of five adjoining ones of said T-shaped appendages of said housing.

17. The air filter assembly system of claim 1, wherein said locking mechanism includes:
  i. a boss portion, with an axial through bore, having spaced inboard and outboard end faces, the latter including one of a first plurality of detent recessed and detent raised portions;
  ii. a lock lever having a first shaft portion adapted to be inserted into said axial through bore and a handle portion at one end thereof, said lock lever including a second plurality of one of detent raised and detent recess portions, adapted to operatively engage opposing ones of said first plurality of said detent portions at predetermined angular positions; and
  iii. a second shaft portion, attached to another end of said first shaft portion, having a tension member on the proximate end thereof and a radial lock pin on a distal end thereof, said tension member acting against said inboard end of said boss portion to maintain tension, relative to said lock lever first shaft portion, thereby preventing undesired movement of said lock lever out of an unlocked position.

18. The air filter assembly system of claim 17, wherein said tension member takes the form of a semi-flexible, half moon shaped semi cylindrical protrusion.

19. The air filter assembly system of claim 17, wherein said lock lever further includes a stop member to prevent the rotation of said lock lever beyond a predetermined angular extent.

20. The air filter assembly system of claim 7, wherein said outermost diameter portion of said filter outlet end includes, on its inner peripheral surface, a multiplicity of equally peripherally spaced, in predetermined angular increments, transverse male gear teeth adapted to engage with said multiplicity of female gear teeth of one of said housing halves outer ends.

21. The air filter assembly system of claim 20, wherein said predetermined angular increments have an extent of about 10 degrees and extend around the total periphery of each of said housing outer ends.

22. The air filter assembly system of claim 21, wherein said pluralities of engaged male and female gear teeth permit angular, adjustable, positioning of said filter outlet end and one of said housing halves, relative to each other, in 10 degree increments.

23. The air filter assembly system of claim 1, wherein said annular connecting wall, between said radially innermost air outlet portion and said first radially larger diameter annular rib portion of said filter outlet end, takes the form of a flared annular connecting wall, the latter providing a curved, smooth, transition for air emanating from said air filter assembly system.

24. The air filter assembly system of claim 1, wherein, in said filter outlet end, said third of said plurality of an annular rib portions, adjoining said radially outermost rib portion, and said second of said annular rib portions, adjoining said third rib portion, define an annular groove therebetween for sealingly receiving said annular inner end portion of said primary filter pack.

25. The air filter assembly system of claim 24, wherein the inner peripheral surface of said third rib portion and the outer annular surface of said second rib portion serve as radial seal surfaces for said annular inner end portion of said primary filter pack.

26. The air filter assembly system of claim 1, wherein, in said filter outlet end, an inner peripheral surface of said first radially larger diameter annular rib portion serves both as a locating and peripheral seal surface for said annular base of said safety filter assembly.

27. The air filter assembly system of claim 1, wherein the diameter of said filter outlet end annular air outlet portion is smaller than that of said cylindrical air inlet.

28. The air filter assembly system of claim 1, wherein said filter outlet end further includes an apertured first boss portion, radially extending outwardly from said innermost annular air outlet portion for a radial extent greater than that of said outermost diameter rib portion.

29. The air filter assembly system of claim 28, wherein said filter outlet end further includes an apertured second boss portion, substantially parallel with said first boss portion, extending outwardly from said innermost annular air outlet portion to about said outermost diameter rib portion, said first and second rib portions serving as attachment points for one of crankcase ventilation and filter restriction indicators.

30. The air filter assembly system of claim 1, wherein a maximum diameter portion, of the end cap of said primary filter pack assembly, is slightly greater than that of said peripheral outer lip and includes opposed, radially flared portions that function as operator handles during installation and removal of said primary filter pack assembly into and from said air filter assembly system.

31. The air filter assembly system of claim 30, said end cap further including a central domed area and a plurality of radially inwardly directed, contoured, spiraling arms, together with a plurality of spaced outwardly directed protrusions with undercuts, said spiraling arms and protrusion undercuts in conjunction with said interposed adhesive material, adding both a mechanical attachment of said primary filter pack to said end cap and resisting any undesired radial twisting of said primary filter pack relative to said end cap.

32. The air filter assembly system of claim 31, wherein said adhesive material is comprised of an adhesive type of urethane having a free rise density of about 30-40 lb/cu.ft. and a Shore "A" hardness of about 60 minimum.

33. The air filter assembly system of claim 1, wherein said sealing material, on the inner annular end portion of said primary filter pack, is comprised of a foaming type of urethane having a free rise density of about 22-25 lb/cu.ft. and a Shore "A" hardness of about 50, said foaming type urethane serving the dual functions of sealing said primary filter pack inner annular end portion as well as providing radial inner and outer seals relative to said filter outlet end second and third rib portions, respectively.

34. The air filter assembly system of claim 30, said primary filter pack assembly end cap maximum diameter portion further including, on its inner peripheral annular surface, a plurality of spaced, recessed, radially directed slots, said slots allowing any water, trapped within said air filter assembly, to drain therefrom during periods of non-use thereof.

35. The air filter assembly system of claim 1, wherein said safety filter assembly is comprised of a felt type filter medium enveloped and retained by an open, lattice type space frame.

36. The air filter assembly system of claim 35, wherein said felt type filter medium is comprised of an about 15.0-denier needlepunched polyester medium having a Frazier Air Permeability of about 300 CFM per square foot at 0.5 inches of water.

37. The air filter assembly system of claim 36, wherein said lattice type space frame is comprised of a glass filled nylon material.

38. The air filter assembly system of claim 37, wherein said lattice type space frame is over molded onto said polyester medium.

39. The air filter assembly system of claim 35, wherein an annular peripheral sealing ring portion of said annular base, comprised of said felt type medium, is adapted to sealingly abut an inside peripheral surface of said first radially larger diameter annular rib portion of said filter outlet end.

40. An air filter assembly comprising in combination:
  a. a housing split into abutting, generally cylindrical, housing halves, adapted to be joined at mating peripheral inner ends via a plurality of substantially equally peripherally spaced, opposed, abutting retaining members having opposing lateral recess portions defining T-shaped appendages, each housing half also being provided, at its peripheral outer end, with a multiplicity of equally peripherally spaced, in predetermined first angular increments, transverse female gear teeth;

b. a cylindrical air inlet, on said housing, formed of transversely directed, abutting, semi-cylindrical air inlet portions, perpendicular to said housing, emanating from opposed curved portions of said housing halves inner ends, said cylindrical air inlet being substantially tangential with the peripheral curvature of said housing;

c. a primary filter pack assembly including a basically disc-shaped, rigid, end cap having a diameter, greater than those of housing halves outer ends, and an inwardly depending, perpendicular, peripheral, outer lip of a diameter and axial extent so as to permit a slip-fit insertion of said cap into one of said housing halves outer ends, said end cap also including an inwardly depending, perpendicular, peripheral, inner lip, said lips defining, therebetween, an inner groove adapted to receive as well as fixedly confine and seal, via the addition of an adhesive material, an outer annular end portion of a generally cylindrical primary filter pack, with an inner annular end portion thereof being provided with a sealing material that serves the functions of both an inboard radial seal and an outboard radial seal, relative to a filter outlet end, said primary filter pack assembly, via its attached end cap, being adapted to be removably secured to said one of said housing halves, with said primary filter pack extending into said housing, via a plurality of peripherally spaced first latches attached to said one of said housing halves;

d. said filter outlet end being generally annular in shape and having a plurality of coaxial, longitudinally extending annular rib portions, with an outermost diameter rib portion thereof having an inner surface of a diameter and axial extent so as to permit a slip-fit over one of said housing halves outer ends, said outermost diameter portion including, on its inner peripheral surface, a multiplicity of equally peripherally spaced, in predetermined second angular increments, transverse male gear teeth adapted to mate with the female gear teeth of one of said housing halves outer ends; said plurality of annular rib portions including a radially innermost annular air outlet portion connected to a first radially larger diameter annular rib portion via a flared, annular connecting wall, and second and third successively larger diameter, spaced annular rib portions, with adjacent ones of said outermost, first, second and third rib portions being connected via annular end walls, said outlet end being adapted to be removably secured to one of said housing halves via a plurality of peripherally spaced second latches attached to one of said housing halves; and e. a safety filter assembly having a generally truncated cone-shaped body with an annular base at one end and an inverted, generally conical, inwardly directed, recessed portion attached to another end of said body, said safety filter assembly being comprised of a felt-type filter medium enveloped and retained by a lattice type space frame, said safety filter assembly being adapted to be inserted into said filter outlet end, with said safety filter annular base being sealingly received within said outlet end first radially larger diameter annular rib portion and said safety filter assembly extending into said housing and therein, being held in place by and within said primary filter pack.

41. The air filter assembly of claim 40, further including a filter attachment base assembly including a base frame with perpendicularly spaced side plates having, on their upper surfaces, a short arcuate first bed portion, having a first radius of curvature, said first bed portion including a plurality of similarly curved, lateral, support pads, with integrated vertical stop portions, said support pads being separated via intermediate spacings, said base frame including a short arcuate second bed portion having a second radius of curvature slightly greater than that of said first bed portion, said first and second bed portions, together with said spaced support pads and stop portions, defining, therebetween, a plurality of spaced, curved slot portions, said filter attachment base assembly further including a locking mechanism having a lock pin rotatable into the space between said first and second bed portions, said housing being adapted to be joined to said filter attachment base assembly by positioning said housing so that a plurality of said T-shaped appendages, after being lined up with successive ones of the internal spacings between said first bed support pads, enter said curved slot portions, with rotation of said housing causing said support pads to enter said opposed recess portions of said T-shaped appendages and, continuing said rotation until said support pad stop portions abut one side of said appendages and, thereafter rotating said locking mechanism until said lock pin operatively engages another side of one of said appendages.

42. The air filter assembly of claim 41, wherein said first angular increments are about 20 degrees and have a total peripheral extent of about 240 degrees.

43. The air filter assembly of claim 42, when said housing is secured to said filter attachment base assembly, said T-shaped appendages permit the angular adjustment of said housing, relative to said filter attachment base assembly, in about 20 degree increments, through about 200 degrees of rotation.

44. The air filter assembly of claim 40, wherein said predetermined first and second angular increments of said gear teeth have an angular extent of about 10 degrees and permit angular, adjustable, positioning of said filter outlet end, at either of said housing halves, relative to one another, in about 10 degree increments.

45. The air filter assembly of claim 41, wherein incremental longitudinal rotation of said housing, relative to said attachment base assembly, for 180 degrees, successively places said air inlet on one of a first end, a first side, a second end and a second side, respectively of a longitudinal center line of said housing.

46. The air filter assembly of claim 41, wherein said locking mechanism includes:

i. a boss portion, with an axial through bore, having spaced inboard and outboard end faces, said outboard end face including a plurality of detent recesses;

ii. a lock lever having a first shaft portion inserted into said axial through bore and having a handle portion at one end thereof, said lock lever including a plurality of detent raised portions adapted to operatively engage said detent recesses at predetermined angular positions of said first shaft portion relative to said boss portion; and iii. a second shaft portion, attached at one end to another end of said first shaft portion, said second shaft portion having a tension member at said one end and a radial locking pin on another end thereof, said tension member acting against said boss portion inboard end to maintain tension, relative to said lock lever first shaft portion.

47. The air filter assembly of claim 40, wherein, in said filter outlet end, said third annular rib portion, adjoining said radially outermost rib portion, and said second rib portion, adjoining said third rib portion, define, therebetween, an annular groove for sealingly receiving said annular inner end portion of said primary filter pack.

48. The air filter assembly of claim 40, wherein, in said filter outlet end, an inner peripheral surface of said first radially larger rib portion serves as both a locating and peripheral seal surface for said annular base of said safety filter assembly.

49. The air filter assembly of claim 40, wherein said cap end of said primary filter pack assembly further includes, at a maximum diameter portion thereof, a pair of opposed, radially extending operator handle portions.

50. The air filter assembly of claim 40, wherein said safety filter assembly lattice type space frame is comprised of a glass filled nylon material that is over molded onto said felt filter medium which is comprised of a polyester medium.

51. The air filter assembly of claim 50, wherein said polyester medium is comprised of an about 15.0-denier needlepunched polyester medium having a Frazier Air Permeability of about 300 CFM per square foot at 0.5 inches of water.

* * * * *